US00RE47434E

(19) United States
(12) Reissued Patent
Hidai et al.

(10) Patent Number: US RE47,434 E
(45) Date of Reissued Patent: *Jun. 11, 2019

(54) DEVICE AND METHOD FOR DETECTING OBJECT AND DEVICE AND METHOD FOR GROUP LEARNING

(71) Applicant: SONY CORPORATION, Tokyo (JP)

(72) Inventors: Kenichi Hidai, Tokyo (JP); Kohtaro Sabe, Tokyo (JP); Kenta Kawamoto, Tokyo (JP)

(73) Assignee: SONY CORPORATION, Tokyo (JP)

( * ) Notice: This patent is subject to a terminal disclaimer.

(21) Appl. No.: 14/743,538

(22) Filed: Jun. 18, 2015

Related U.S. Patent Documents

Reissue of:
(64) Patent No.: 7,574,037
Issued: Aug. 11, 2009
Appl. No.: 10/994,942
Filed: Nov. 22, 2004

U.S. Applications:
(63) Continuation of application No. 14/091,410, filed on Nov. 27, 2013, now Pat. No. Re. 45,595, which is a
(Continued)

(30) Foreign Application Priority Data

Nov. 25, 2003 (JP) ..... 2003-394556

(51) Int. Cl.
*G06K 9/62* (2006.01)
*G06K 9/00* (2006.01)

(52) U.S. Cl.
CPC ..... *G06K 9/6282* (2013.01); *G06K 9/00248* (2013.01); *G06K 9/6256* (2013.01)

(58) Field of Classification Search
CPC ..... G06K 9/00248; G06K 9/6282; G06K 9/6256; G06K 9/00234
(Continued)

(56) References Cited

U.S. PATENT DOCUMENTS 5,874,966 A * 2/1999 Polimeni ..... G06F 3/0481 345/441
6,272,247 B1 * 8/2001 Manickam ..... G06K 9/6857 382/217
(Continued)

OTHER PUBLICATIONS

Xiangrong Chen et al: "Learning representative local features for face detection" Proceedings 2001 IEEE Conference on Computer Vision and Pattern Recognition. CVPR 2001. Kauai, Hawaii, Dec. 8-14, 2001, Proceedings of the IEEE Computer Conference on Computer Vision and Pattern Recognition, Los Alamitos, CA, IEEE Comp. Soc, US, vol. vol. 1 of 2, Dec. 8, 2001 (Dec. 8, 2001), pp. 1126-1131, XP010583872 ISBN: 0-7695-1272-0.
(Continued)

*Primary Examiner* — Adam L Basehoar
(74) *Attorney, Agent, or Firm* — Haug Partners LLP; William S. Frommer

(57) ABSTRACT

An object detecting device for detecting an object in a given gradation image. A scaling section generates scaled images by scaling down a gradation image input from an image output section. A scanning section sequentially manipulates the scaled images and cutting out window images from them and a discriminator judges if each window image is an object or not. The discriminator includes a plurality of weak discriminators that are learned in a group by boosting and an adder for making a weighted majority decision from the outputs of the weak discriminators. Each of the weak discriminators outputs an estimate of the likelihood of a window image to be an object or not by using the difference of the luminance values between two pixels. The discriminator suspends the operation of computing estimates for a window image that is judged to be a non-object, using a threshold value that is learned in advance.

6 Claims, 18 Drawing Sheets

Related U.S. Application Data continuation of application No. 13/669,820, filed on Nov. 6, 2012, now Pat. No. Re. 44,703, which is a continuation of application No. 13/208,123, filed on Aug. 11, 2011, now Pat. No. Re. 43,873, which is an application for the reissue of Pat. No. 7,574,037.

(58) Field of Classification Search
USPC ..... 382/159, 103, 118, 155, 190, 194
See application file for complete search history.

(56) References Cited

U.S. PATENT DOCUMENTS 6,487,304 B1 11/2002 Szeliski
6,711,279 B1 * 3/2004 Hamza et al. ..... 382/103
7,050,607 B2 5/2006 Li et al.
7,054,489 B2 5/2006 Yamaoka et al.
7,536,044 B2 * 5/2009 Zhou ..... G06K 9/6206 382/128
7,953,253 B2 * 5/2011 Cao ..... G06K 9/00234 382/115
8,520,955 B2 * 8/2013 Ai ..... 382/201
8,660,320 B2 * 2/2014 Yokoyama ..... H04N 5/142 382/118
2002/0102024 A1 8/2002 Jones et al.
2003/0110147 A1 * 6/2003 Li ..... G06K 9/00228 706/1
2004/0233299 A1 * 11/2004 Ioffe ..... G06K 9/00228 348/239
2005/0013479 A1 * 1/2005 Xiao ..... G06K 9/4614 382/159
2006/0193520 A1 * 8/2006 Mita ..... G06K 9/00248 382/190
2007/0076954 A1 * 4/2007 Terakawa ..... G06K 9/00248 382/190
2007/0086660 A1 * 4/2007 Ai ..... G06K 9/00208 382/226
2013/0159292 A1 * 6/2013 Larlus ..... G06F 17/30017 707/723
2014/0180977 A1 * 6/2014 Cosatto ..... G04N 99/005 706/12

OTHER PUBLICATIONS

Colmenarez A J et al: "Face detection with information-based maximum discrimination" Proceedings. 1997 IEEE Computer Society Conference on Computer Vision and Pattern Recognition (Cat. No. 97CB36082) IEEE Comput. Soc Los Alamitos, CA, USA, Jun. 1997 (Jun. 1997), pp. 782-787, XP002312941 ISBN: 0-8186-7822-4.

Marcel S et al: "Biometric face authentication using pixel-based weak classifiers" Biometric Authentication. ECCV 2004 International Workshop, Bioaw 2004. Proceedings (Lecture Notes in Comput. Sci. vol. 3087) Springer-Verlag Berlin, Germany, May 2004 (May 2004), pp. 24-31, XP002312942 ISBN: 3-540-22499-8.

* cited by examiner

Inter-pixel difference characteristic = $I_1 - I_2$

Formula 3

Formula 4

Formula 5

---------- Distribution of non-object data ($y_i = -1$)

———— Distribution of object data ($y_i = 1$)

Forehead is lighter than eyes
Threshold value: 18.5

Cheeks are lighter than eyes
Threshold value: 17.5

Forehead is lighter than hair
Threshold value: 26.5

Under-nose area is lighter than nostrils
Threshold value: 5.5

Cheeks are lighter than hair
Threshold value: 22.5

Chin is lighter than lips
Threshold value: 4.5

Before removing overlapping area

After removing overlapping area

DEVICE AND METHOD FOR DETECTING OBJECT AND DEVICE AND METHOD FOR GROUP LEARNING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This is a continuation reissue of application Ser. No. 14/091,410, filed Nov. 27, 2013, now U.S. Pat. RE45595, issued Jun. 30, 2015, which is a continuation reissue of reissue application Ser. No. 13/669,820, filed Nov. 6, 2012, now U.S. Pat. RE44703, issued Jan. 14, 2014, which is a continuation reissue of reissue application Ser. No. 13/208,123, filed Aug. 11, 2011, now U.S. Pat. RE43873, issued Dec. 25, 2012, which is a reissue of application Ser. No. 10/994,942, filed Nov. 22, 2004, now U.S. Pat. No. 7,574,037, issued Aug. 11, 2009, the entirety of which is incorporated herein by reference. NOTICE: More than one reissue application has been filed for the reissue of U.S. Pat. No. 7,574,037. The reissue applications are application Ser. No. 14/743,538 (the present application), Ser. Nos. 14/091,410, 13/669,820 and 13/208,123.*

BACKGROUND OF THE INVENTION

1. Field of the Invention

This invention relates to a device and a method for detecting an object such as an image of a face on a real time basis and also to a device and a method for group learning that are adapted to practice a device and a method for detecting an object according to the invention in a group.

This application claims priority of Japanese Patent Application No. 2003-394556, filed on Nov. 25, 2003, the entirety of which is incorporated by reference herein.

2. Related Background Art

Many techniques have been proposed to date to detect a face out of a complex visual scene, using only a gradation pattern of the image signal of the scene without relying on any motion. For example, a face detector described in Patent Document 1 (Specification of Published U.S. Patent Application No. 2002/0102024) listed below employs an AdaBoost that utilizes a filter like a Haar's base for a weak discriminator (weak learner). It can compute a weak hypothesis at high speed by using an image referred to as integral image and a rectangle feature as will be described in greater detail hereinafter.

FIG. 1 of the accompanying drawings schematically illustrates a rectangle feature described in Patent Document 1. Referring to FIG. 1 that shows input images 142A through 142D, with the technique described in Patent Document 1, there are prepared a plurality of filters (weak hypotheses) that are adapted to determine the total sum of the luminance values of adjacently located rectangular areas of a same size and output the difference between the total sum of the luminance values of one of the rectangular areas and the total sum of the luminance values of the other rectangular area. For example, input image 142A in FIG. 1 shows a filter 154A that subtracts the total sum of the luminance values of shaded rectangular box 154A-2 from the total sum of the luminance values of rectangular box 154A-1. Such a filter comprising two rectangular boxes is referred to as 2 rectangle feature. On the other hand, input image 142C in FIG. 1 has three rectangular boxes 154C-1 through 154C-3 formed by dividing a single rectangular box and shows a filter 154C that subtracts the total sum of the luminance values of the shaded rectangular box 154C-2 from the total sum of the luminance values of the rectangular boxes 154C-1 and 154C-3. Such a filter comprising three rectangular boxes is referred to as 3 rectangle feature. Furthermore, input image 142D in FIG. 1 has four rectangular boxes 154D-1 through 154D-4 formed by vertically and horizontally dividing a single rectangular box and shows a filter 154D that subtracts the total sum of the luminance values of the shaded rectangular boxes 154D-2 and 154D-4 from the total sum of the luminance values of the rectangular boxes 154D-1 and 154D-3. Such a filter comprising four rectangular boxes is referred to as 4 rectangle feature.

Now, an occasion where an image of a face as shown in FIG. 2 is judged to be a face by means of a rectangle feature 154B as shown in FIG. 1 will be described below. The 2 rectangle feature 154B comprises two rectangular boxes 154B-1 and 154B-2 produced by vertically dividing a single rectangular box and is adapted to subtract the total sum of the luminance values of the shaded rectangular box 154B-1 from the total sum of the luminance values of the rectangular box 154B-2. It is possible to estimate the input image to be a face or not a face (correct interpretation or incorrect interpretation) by a certain probability by utilizing the fact that the luminance value of an eye area is lower than that of a cheek area in a human face (object) 138. This arrangement is utilized as one of the weak discriminator of an AdaBoost.

For detecting a face, it is necessary to cut out areas of various sizes (to be referred to as search windows) in order to detect areas of a face having various different sizes contained in an input image for the purpose of judging if the input image is a face or not. However, an input image of a face that is formed by 320×240 pixels, for instance, includes face areas (search windows) of about 50,000 different sizes and it is an extremely time consuming to carry out computational operations for all the windows. Thus, the technique of Patent Document 1 utilizes an image that is referred to as integral image. Referring to FIG. 3, an integral image is an image in which the (x, y)-th pixel 162 of the input image 144 represents a value that is equal to the total sum of the luminance values of the upper left pixels relative to the pixel 162 as expressed by formula (1) below. In other words, the value of the pixel 162 is equal to the total sum of the luminance values of the pixels contained in rectangular box 160 that is located upper left relative to the pixel 162. In the following description, an image in which each pixel has a value expressed by formula (1) below is referred to as integral image.

[formula 1]

$$I(x, y) = \sum_{x' < x, y' < y} S(x', y') \tag{1}$$

It is possible to carry out computational operations at high speed for a rectangular box of any size by using such an integral image. FIG. 4 shows four rectangular boxes including an upper left rectangular box 170, a rectangular box 172 located to the right of the rectangular box 170, a rectangular box 174 located under the rectangular box 170 and a rectangular box 176 located lower right relative to the rectangular box 170. The four corners of the rectangular box 176 are denoted by P1, P2, P3 and P4 that are arranged clockwise. Then, P1 has a value that is equal to the total sum A of the luminance values of the rectangular box 170 (P1=A) and P2 has a value that is equal to A+the total sum B of the luminance values of the rectangular box 172 (P2=A+B), whereas P3 has a value that is equal to A+the total sum C of the luminance values of the rectangular box 174 (P3=A+C) and P4 has a value that is equal to A+B+C+the total sum D of the luminance values of the rectangular box 176 (P4=A+B+C+D). The total sum D of the luminance values of the rectangular box D can be determined by using formula of P4−(P2+P3)−P1. Thus, the total sum of the luminance values of any of the rectangular boxes can be determined at high speed by arithmetic operations using the pixel values of the four corners of the rectangular box D. Normally, the input image is subjected to scale conversions and a window (search window) having a size same as the size of the learning samples to be used for learning is cut out from each image obtained as a result of scale conversions so as to make it possible to search for search windows with different sizes. However, a vast amount of computational operations has to be carried out for scale conversions of an input image for the purpose of cutting out search windows of all different sizes as described above. Thus, with the technique described in Patent Document 1, integral images that allow to determine the total sum of the luminance values of rectangular boxes at high speed is used so as to employ rectangle features in order to reduce the amount of computations operations.

However, a face detector described in above cited Patent Document 1 can detect only an object whose size is integer times as large as the size of the learning samples used for learning. This is because above cited Patent Document 1 proposes not to change the sizes of search windows by scale conversions of an input image but to transform an input image into integral images and detect face areas of different search windows by utilizing the integral images. More specifically, integral images are made discrete by a unit of pixel so that, when a window size of 20×20 is used, it is not possible to define a window size of 30×30 and hence it is not possible to detect a face of this window size.

Additionally, only the difference of the luminance values of adjacently located rectangular boxes are used for the above rectangle feature for the purpose of raising the speed of computational operations. In other words, it is not possible to detect the difference of luminance values of rectangular boxes that are separated from each other to consequently limit the capability of detecting an object.

While it is possible to search for windows of any sizes by scale conversions of the integral images and hence it is possible to utilize the difference of the luminance values of rectangular boxes that are separated from each other, a vast amount of computational operations will be required for scale conversions of integral images so that the advantage of the high speed processing operation using integral images will be offset. Additionally, the number of different types of filters will be enormous to accommodate the differences of the luminance values of rectangular boxes that are separated from each other and consequently a vast amount of computational operations will be required.

SUMMARY OF THE INVENTION

In view of the above identified circumstances, it is therefore the object of the present invention to provide a device and a method for detecting an object in a group learning that can speed up the computational processing operations at the time of learning and detecting an object of any size and show a high degree of discrimination capabilities as well as a device and a method for group learning that are adapted to practice a device and a method for detecting an object according to the invention in a group.

In an aspect of the present invention, the above first object is achieved by providing an object detecting device for detecting if a given gradation image is an object or not, the device comprising: a plurality of weak discriminating means for computing an estimate indicating that the gradation image is an object or not according to a characteristic quantity that is equal to the difference of the luminance values of two pixels at two different positions that is learnt in advance; and a discriminating means for judging if the gradation image is an object or not according to the estimate computed by one of or the estimates computed by more than one of the plurality of weak discriminating means.

Thus, according to the invention, a plurality of weak discriminating means use a very simple characteristic quantity that is equal to the difference of the luminance values of two pixels at two different positions to weakly judge if a given gradation image is an object or not so that the detecting operation can be carried out at high speed.

Preferably, the discriminating means computes the value of the weighted majority decision by multiplying each of the estimates by the reliability of the corresponding weak discriminating means obtained as a result of the learning and adding the products of the multiplications and judges if the gradation image is an object or not according to the majority decision value. In short, an object detecting device according to the invention can judge if a gradation image is an object or not by using the result of a majority decision that is made by combining the estimates of a plurality of weak discriminating means.

Preferably, the plurality of weak discriminating means compute estimates sequentially and the discriminating means sequentially updates the value of weighted majority decision each time when an estimate is computed and controls the object detecting operation of the device so as to judge if the computation of estimates is suspended or not according to the updated value of weighted majority decision. In short, an object detecting device according to the invention can suspend its operation without waiting until all the weak discriminating means compute estimates by having the weak discriminators compute estimates sequentially and evaluating the value of weighted majority decision so as to further speed up the object detecting operation.

Preferably, the discriminating means is adapted to suspend the operation of computing estimates depending on if the value of weighted majority decision is smaller than a suspension threshold value or not and the weak discriminating means are sequentially generated by group learning, using a leaning sample of a plurality of gradation images provided with respective correct answers telling if each of the gradation images is an object or not, the suspension threshold value being the minimum value in the values of weighted majority decision updated by adding the weighted reliabilities to the respective estimates of the learning samples of the objects, as computed each time a weak discriminating means is generated in the learning session by the generated weak discriminating means. Thus, it is possible to suspend the processing operation of the weak discriminating means accurately and efficiently as a result of learning the minimum value that the gradation images of the objects provided with respective correct answers can take as suspension threshold value.

Preferably, if the minimum value in the values of the weighted majority decision obtained in the learning session is positive, 0 is selected as the suspension threshold value. Then, a minimum value that is not smaller than 0 can be selected as suspension threshold value when the learning session is conducted by using a group learning algorithm as in the case of AdaBoost where suspension of the processing operation is determined depending on positiveness or negativeness of the output of any of the weak discriminating means.

Furthermore, preferably, each of the weak discriminating means decisively outputs its estimate by computing the estimate as binary value indicating if the gradation image is an object or not depending on if the characteristic quantity is smaller than a predetermined threshold value or not. Preferably, each of the weak discriminating means outputs the probability that the gradation image is an object as computed on the basis of the characteristic quantity so as to probabilistically output its estimate.

In another aspect of the present invention, there is provided an object detecting method for detecting if a given gradation image is an object or not, the method comprising: a weak discriminating step of computing an estimate indicating that the gradation image is an object or not according to a characteristic quantity that is equal to the difference of the luminance values of two pixels at two different positions that is learnt in advance by each of a plurality of weak discriminating means; and a discriminating step of judging if the gradation image is an object or not according to the estimate computed by one of or the estimates computed by more than one of the plurality of weak discriminator.

In still another aspect of the present invention, there is provided a group learning device for group learning using learning samples of a plurality of gradation images provided with respective correct answers telling if each of the gradation images is an object or not, the device comprising: a learning means for learning a plurality of weak discriminators for outputting an estimate indicating that the gradation image is an object or not in a group, using a characteristic quantity that is equal to the difference of the luminance values of two pixels at arbitrarily selected two different positions as input.

Thus, with a group learning device according to the invention, weak discriminators that use a very simple characteristic quantity of the difference of the luminance values of two pixels at arbitrarily selected two different positions in a learning sample are generated by group learning so that it is possible to carry out an object detecting operation at high speed when a detecting device is formed to detect an object by using a number of results of discrimination of the generated weak discriminators.

Preferably, the learning means has: a weak discriminator generating means for computing the characteristic quantity of each of the learning samples and generating the weak discriminators according to the respective characteristic quantities; an error ratio computing means for computing the error ratio of judging each of the learning samples according to the data weight defined for the learning sample for the weak discriminators generated by the weak discriminator generating means; a reliability computing means for computing the reliability of the weak discriminators according to the error ratio; and a data weight computing means for updating the data weight so as to relatively increase the weight of each learning sample that is discriminated as error by the weak discriminators; the weak discriminator generating means being capable of generating a new weak discriminator when the data weight is updated. Thus, a group learning device according to the invention can go on learning as it repeats a processing operation of generating a weak discriminator, computing the error ratio and the reliability thereof and updating the data weight so as to generate a weak discriminator once again.

Preferably, the weak discriminator generating means computes characteristic quantities of a plurality of different types by repeating the process of computing a characteristic quantity for a plurality of times, generate a weak discriminator candidate for each characteristic quantity, computes the error ratio of judging each learning sample according to the data weight defined for the learning sample and select, the weak discriminator candidate showing the lowest error ratio as weak discriminator. With this arrangement, a number of weak discriminator candidates can be generated each time the data weight is updated so that the weak discriminator candidates showing the lowest error ratio is selected as weak discriminator to generate (learn) a weak discriminator.

Furthermore, preferably, a group learning device according to the invention further comprises a suspension threshold value storing means for storing the minimum value in the values of weighted majority decision, each being obtained as a result of that, each time the weak discriminator generating means generates a weak discriminator, the weak discriminator generating means computes an estimate for each learning sample that is an object by means of the weak discriminator and also computes the value of the weighted majority decision obtained by weighting the estimate with the reliability. With this arrangement, the operation of the detecting device formed by a plurality of generated weak discriminators can be carried out at high speed as the minimum value is learnt as suspension threshold value.

In still another aspect of the present invention, there is provided a group learning method of using learning samples of a plurality of gradation images provided with respective correct answers telling if each of the gradation images is an object or not, the method comprising: a learning step of learning a plurality of weak discriminators for outputting an estimate indicating that the gradation image is an object or not in a group, using a characteristic quantity that is equal to the difference of the luminance values of two pixels at arbitrarily selected two different positions as input.

In still another aspect of the present invention, there is provided an object detecting device for cutting out a window image of a fixed size from a gradation image and detecting if the window image is an object or not, the device comprising: a scale converting means for generating a scaled image by scaling up or down the size of the input gradation image; a window image scanning means for scanning the window of the fixed size out of the scaled image and cutting out a window image; and an object detecting means for detecting if the given window image is an object or not;

the object detecting means having:

a plurality of weak discriminating means for computing an estimate indicating that the window image is an object or not according to a characteristic quantity that is equal to the difference of the luminance values of two pixels at two different positions that is learnt in advance; and a discriminating means for judging if the window image is an object or not according to the estimate computed by one of or the estimates computed by more than one of the plurality of weak discriminating means.

Thus, according to the invention, a gradation image is subjected to a scale conversion and a window image is cut out from it to make it possible to detect an object of any size while a plurality of weak discriminating means use a very simple characteristic quantity that is equal to the difference of the luminance values of two pixels at two different positions to compute an estimate that indicates if the window image is an object or not so that the detecting operation can be carried out at high speed.

In a further aspect of the invention, there is provided an object detecting method for cutting out a window image of a fixed size from a gradation image and detecting if the window image is an object or not, the method comprising: a scale converting step of generating a scaled image by scaling up or down the size of the input gradation image; a window image scanning step of scanning the window of the fixed size out of the scaled image and cutting out a window image; and an object detecting step of for detecting if the given window image is an object or not;

the object detecting step having:

a weak discriminating step of computing an estimate indicating that the gradation image is an object or not according to a characteristic quantity that is equal to the difference of the luminance values of two pixels at two different positions that is learnt in advance by each of a plurality of weak discriminators; and a discriminating step of judging if the gradation image is an object or not according to the estimate computed by one of or the estimates computed by more than one of the plurality of weak discriminators.

Thus, since an object detecting device for detecting if a given gradation image is an object or not according to the invention comprises a plurality of weak discriminating means for computing an estimate indicating that the gradation image is an object or not according to a characteristic quantity that is equal to the difference of the luminance values of two pixels at two different positions that is learnt in advance and a discriminating means for judging if the gradation image is an object or not according to the estimate computed by one of or the estimates computed by more than one of the plurality of weak discriminating means, it is very easy to weakly judge if a gradation image is an object or not and the operation of detecting a face can be carried out at high speed on a real time basis.

Additionally, an object detecting method according to the invention can detect if a given gradation image is an object or not at high speed.

Since a group learning device for group learning using learning samples of a plurality of gradation images provided with respective correct answers telling if each of the gradation images is an object or not according to the invention comprises a learning means for learning a plurality of weak discriminators for outputting an estimate indicating that the gradation image is an object or not in a group, using a characteristic quantity that is equal to the difference of the luminance values of two pixels at arbitrarily selected two different positions as input, weak discriminators that use a very simple characteristic quantity of the difference of the luminance values of two pixels at arbitrarily selected two different positions can be generated by group learning so that it is possible to compute the characteristic quantity in the learning session at high speed carry out an object detecting operation at high speed when a detecting device is formed to detect an object by using the generated weak discriminators.

Since a group leaning method according to the invention uses learning samples of a plurality of gradation images provided with respective correct answers telling if each of the gradation images is an object or not so that it is possible to learn weak discriminators that constitute an object detecting device adapted to detect an object at high speed.

An object detecting device for cutting out a window image of a fixed size from a gradation image and detecting if the window image is an object or not comprises a scale converting means for generating a scaled image by scaling up or down the size of the input gradation image, a window image scanning means for scanning the window of the fixed size out of the scaled image and cutting out a window image and an object detecting means for detecting if the given window image is an object or not, the object detecting means having a plurality of weak discriminating means for computing an estimate indicating that the window image is an object or not according to a characteristic quantity that is equal to the difference of the luminance values of two pixels at two different positions that is learnt in advance and a discriminating means for judging if the window image is an object or not according to the estimate computed by one of or the estimates computed by more than one of the plurality of weak discriminating means. With this arrangement, it is possible to detect an object of any size at very high speed because the weak discriminating means detect a window image to be an object or not by using a very simple characteristic quantity that is equal to the difference of luminance values of two pixels.

An object detecting method according to the invention can cut out a window image of a fixed size from a gradation image and detect if the window image is an object or not at high speed.

BRIEF DESCRIPTION OF THE DRAWINGS

FIG. 16A is an illustration of a face image group labeled as objects and FIG. 16B is an illustration of a non-face image groups labeled as non-objects;

DETAILED DESCRIPTION OF THE PREFERRED EMBODIMENTS

Now, the present invention will be described in greater detail by referring to the accompanying drawings that illustrate a preferred embodiment of the invention, which is an object detecting device for detecting an object from an image by utilizing ensemble learning (group learning).

A learning machine that is obtained by group learning comprises a large number of weak hypotheses and a combiner for combining them. Boosting may typically be used as combiner for combining the outputs of weak hypotheses with a fixed weight without relying on any input. With boosting, the distribution that learning samples follow is manipulated so as to increase the weight of a learning sample (exercise) that often gives rise to errors and is hard to deal with by using the result of learning the weak hypotheses that are generated so far and a new weak hypothesis is learnt according to the manipulated distribution. As a result, the weight of a learning sample that often gives rise to errors and is hard to be discriminated as object is relatively increased so that consequently weak discriminators that cause learning samples that are hard to be discriminated as objects will be sequentially selected. In other words, weak hypotheses for learning are sequentially generated and a newly generated weak hypothesis is dependent on the weak hypotheses that are generated so far.

A large number of weak hypotheses that are generated sequentially: by learning as described above are used for detecting an object. In the case of AdaBoost, for instance, all the results of discrimination (1 for an object and −1 for a non-object) of the weak hypotheses (to be referred to as weak discriminators hereinafter) generated by learning are supplied to a combiner. Then, the input image is judged to be an object or not as the combiner adds the reliability as computed for each corresponding weak discriminator at the time of learning to all the results of discrimination as weight and outputs the result of the weighted majority decision so as to allow the output value of the combiner to be evaluated.

A weak discriminator judges an input image to be an object or a non-object by using a characteristic quantity of some sort or another. As described hereinafter, the output of a weak discriminator may be decisive or in the form of probability of being the object as expressed in terms of probability density. This embodiment is adapted to detect an object at high speed by utilizing group learning device using weak discriminators for discriminating an object and a non-object by means of a very simple characteristic quantity of the difference of the luminance values of two pixels (to be referred to as inter-pixel difference characteristic hereinafter).

(1) Object Detecting Device

Figure 1:
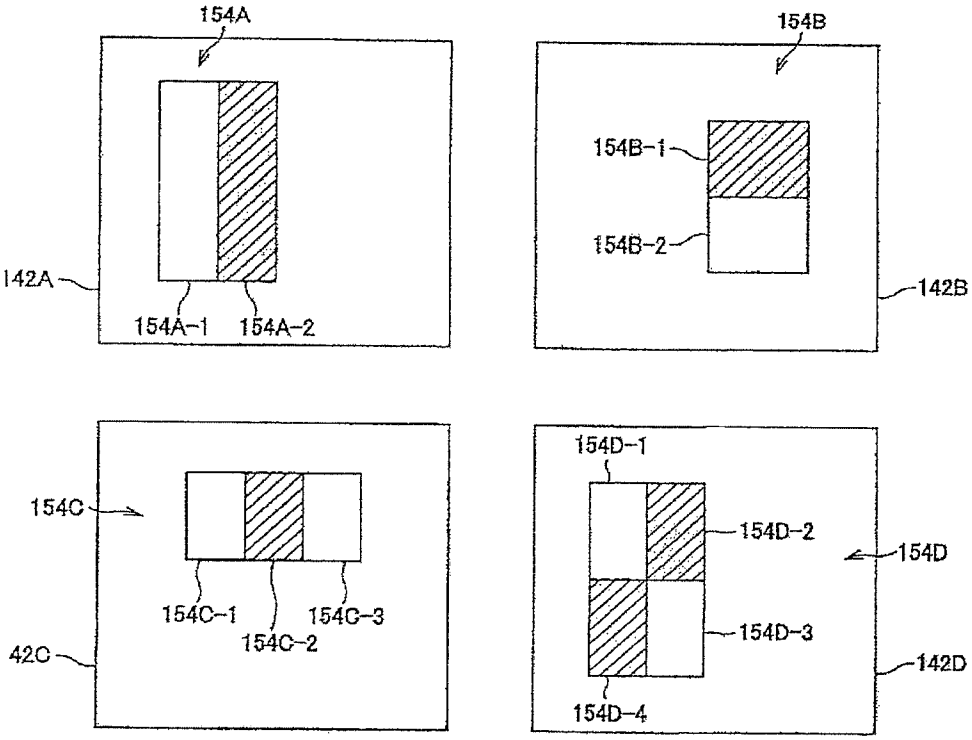
FIG. 1 RELATED ART
FIG. 1 is a schematic illustration of a rectangle feature as described in Patent Document 1.
Figure 2:
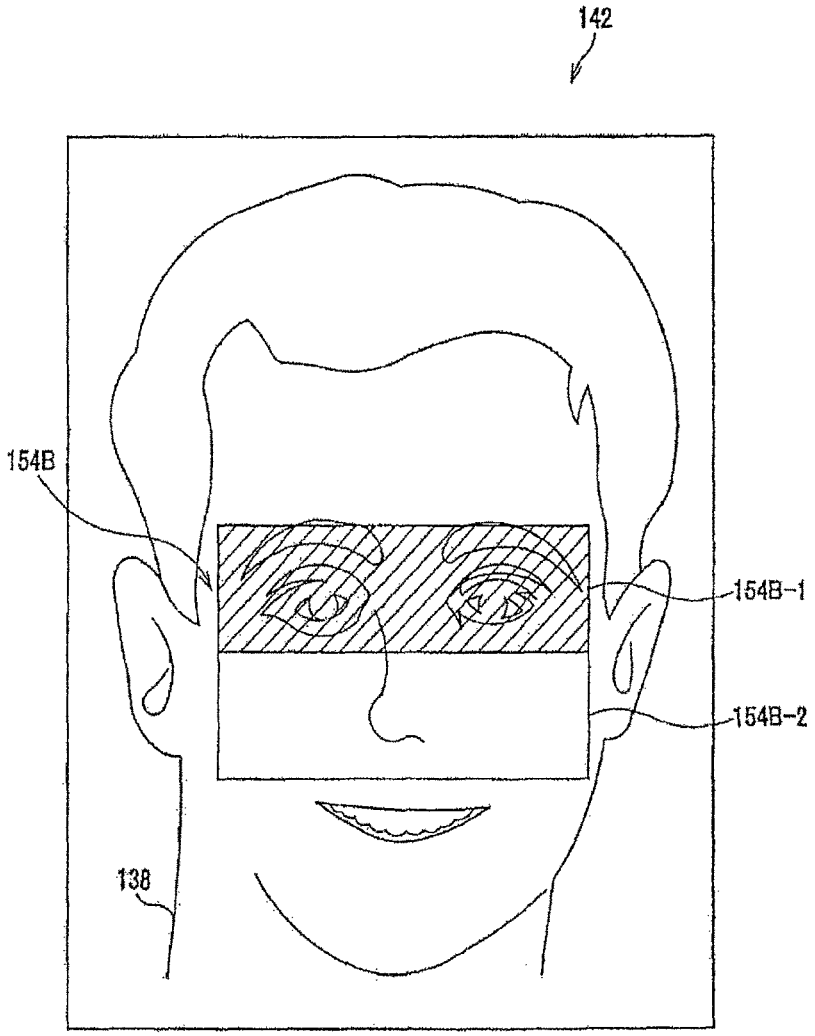
FIG.2 RELATED ART
FIG. 2 is a schematic illustration of a method of discriminating a face image by using a rectangle feature as described in Patent Document 1.
Figure 3:
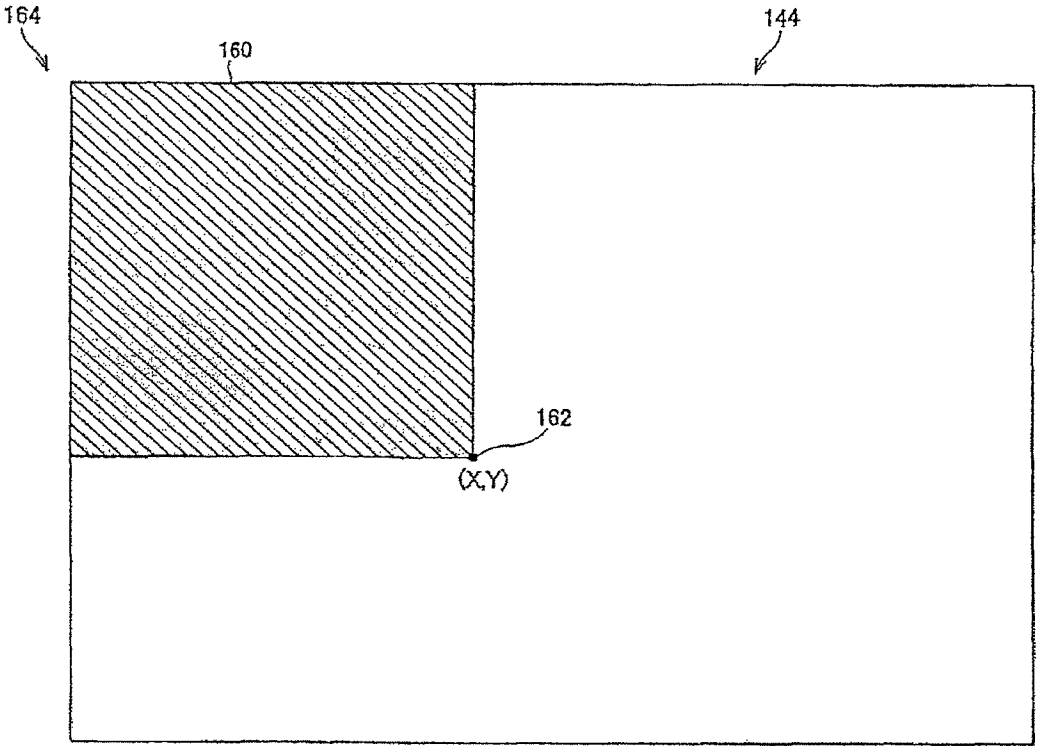
FIG. 3 RELATED ART
FIG. 3 is a schematic illustration of integral images as described in Patent Document 1.
Figure 4:
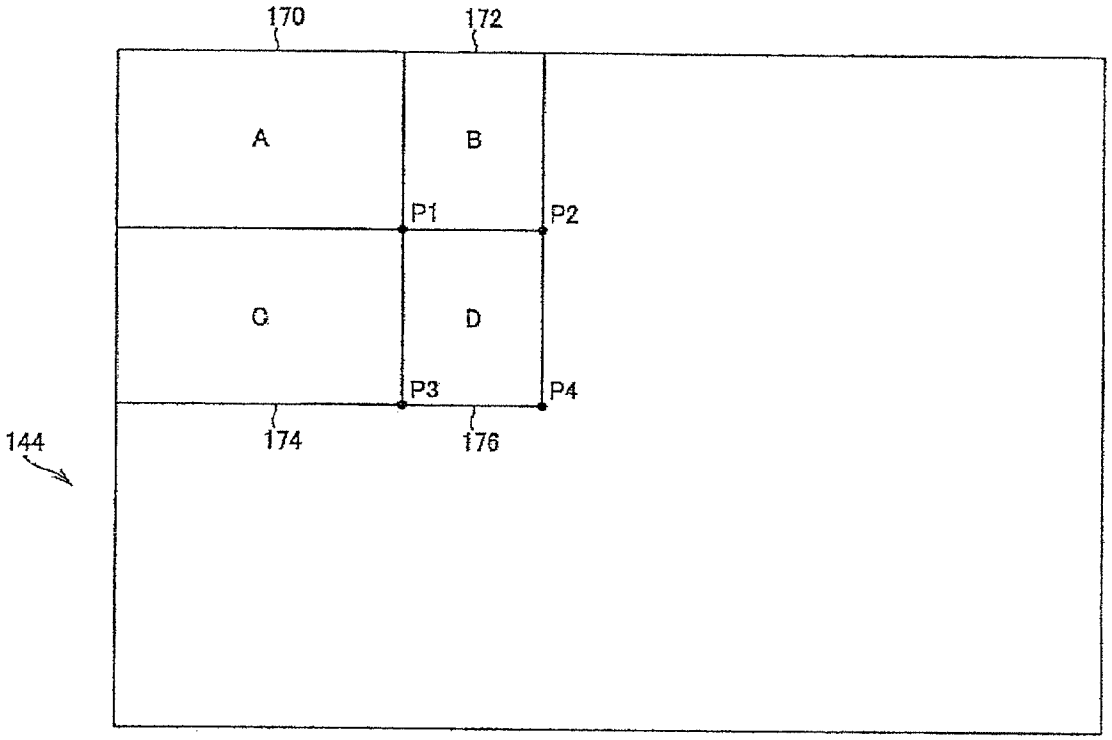
FIG.4 RELATED ART
FIG. 4 is a schematic illustration of a method of computing the total sum of the luminance values of a rectangular box by using integral images as described in Patent Document 1.
Figure 5:
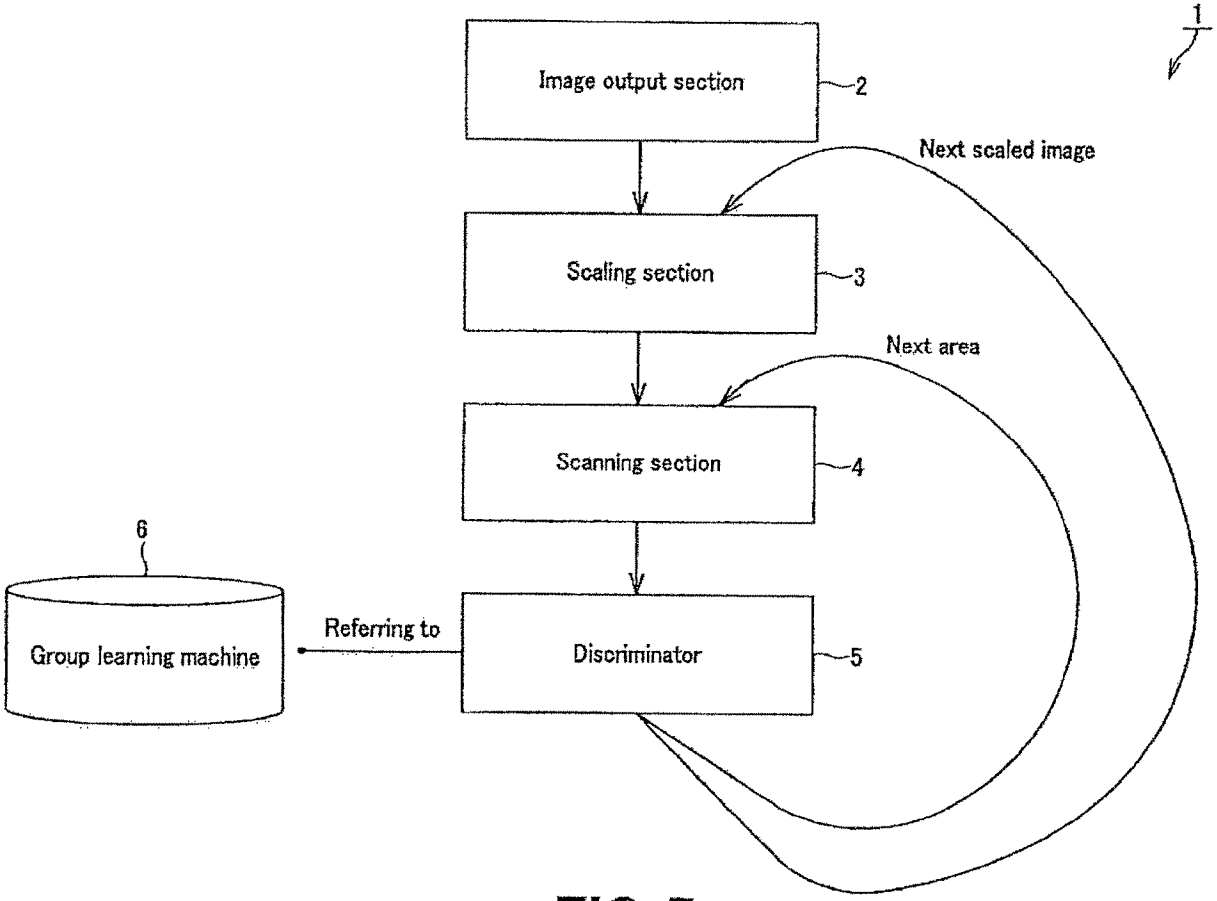
FIG. 5 is a functional block diagram of the object detecting device according to the invention, illustrating the processing function thereof.

FIG. 5 is a functional block diagram of the object detecting device of the embodiment, illustrating the processing function thereof. Referring to FIG. 5, the object detecting device 1 comprises an image output section 2 for outputting a gradation image (luminance image) as input image, a scaling section 3 for scaling up or down the input image, a scanning section 4 for sequentially scanning the window images of a predetermined size typically from the upper left corner that are obtained from the scaled input image and a discriminator 5 for judging if each of the window images, which are sequentially scanned by the scanning section 4, is an object or not and is adapted to output the position and the size of the object, if any, that define the area of the object in the given image (input image). More specifically, the scaling section 3 scales up or down the input image, using all the specified ratios, to output scaled images and the scanning section 3 cuts out window images by sequentially scanning windows having the size of an object to be detected from each scaled image, while the discriminator 5 judges if each window image shows a face or not.

The discriminator 5 judges if the current window image is an object, e.g., a face image, or a non-object by referring to the result of learning of a group learning machine 6 for group learning of a plurality of weak discriminators that constitute the discriminator 5 by group learning.

If a number of objects are detected from an input image, the object detecting device 1 outputs a plurality of pieces of information on areas. Additionally, if the plurality of pieces of information on areas indicates the existence of overlapping areas, the object detecting device 1 can select an area that is evaluated to be a most likely object by means of a method as will be described in greater detail hereinafter.

The image (gradation image) output from the image output section 2 is firstly input to the scaling section 3. The scaling section 3 scales down the image, using bilinear interpolation. This embodiment is adapted not to firstly generate a plurality of scaled down images but to repeat an operation of outputting a necessary image to the scanning section 4 and generating a further scaled down image after the completion of processing the image.

Figure 6:
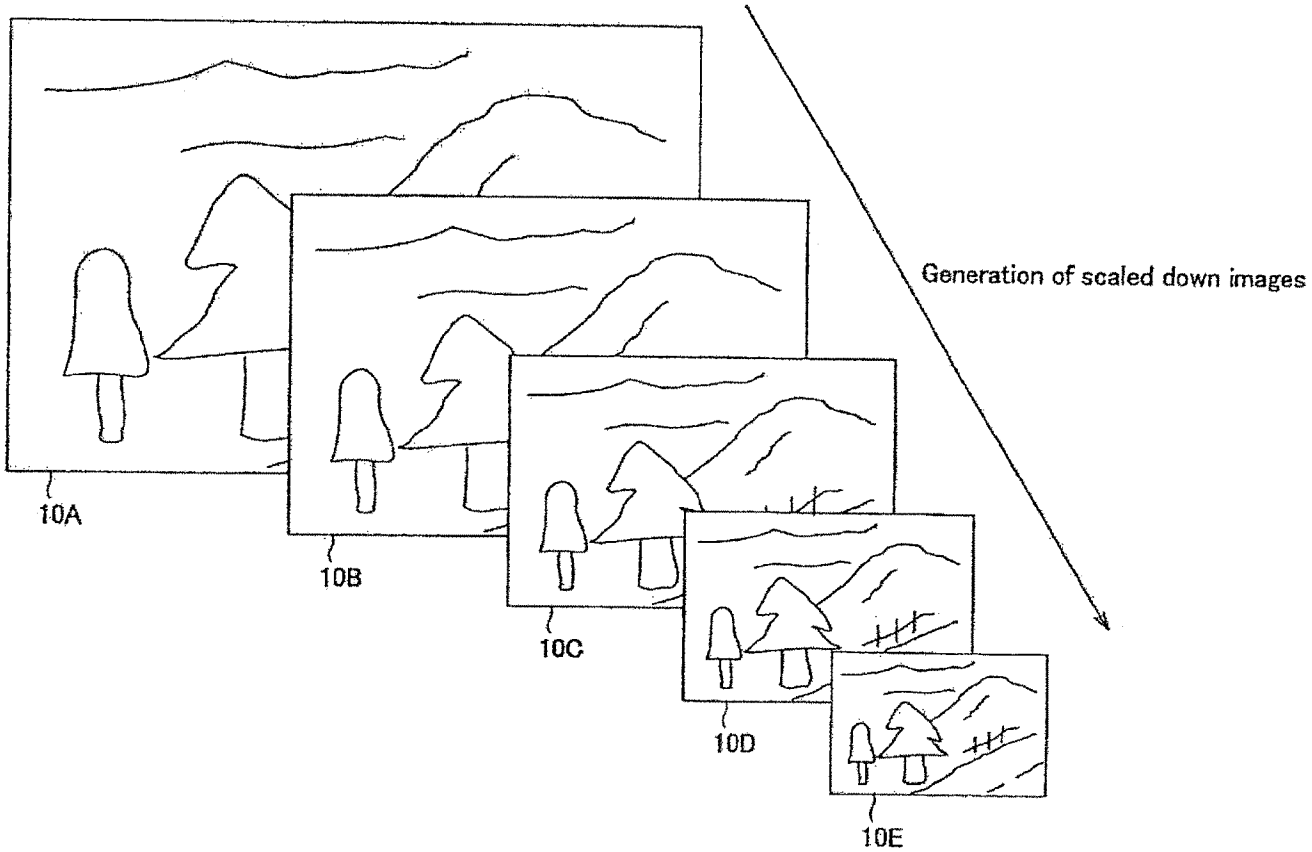
FIG. 6 is a schematic illustration of images subjected to scale conversions by the scaling section of the object detecting device of FIG. 5.

More specifically, firstly the scaling section 3 outputs input image 10A to the scanning section 4 without scaling as shown in FIG. 6 and waits for the completion of processing the input image 10A by the scanning section 4 and the discriminator 5. Thereafter, the scaling section 3 generates another input image 10B by scaling down the input image 10A and waits for the completion of processing the input image 10B by the scanning section 4 and the discriminator 5. Thereafter, the scaling section 3 generates still another input image 10C by scaling down the input image 10B and outputs it to the scanning section 4. In this way, the scaling section 3 sequentially generates scaled down images 10D, 10E, . . . until the size of the last scaled down image becomes smaller than the size of the window that is scanned by the scanning section 4, when it terminates the scaling down operation. After the completion of this processing operation, the image input section 2 outputs the next input image to the scaling section 3.

Figure 7:
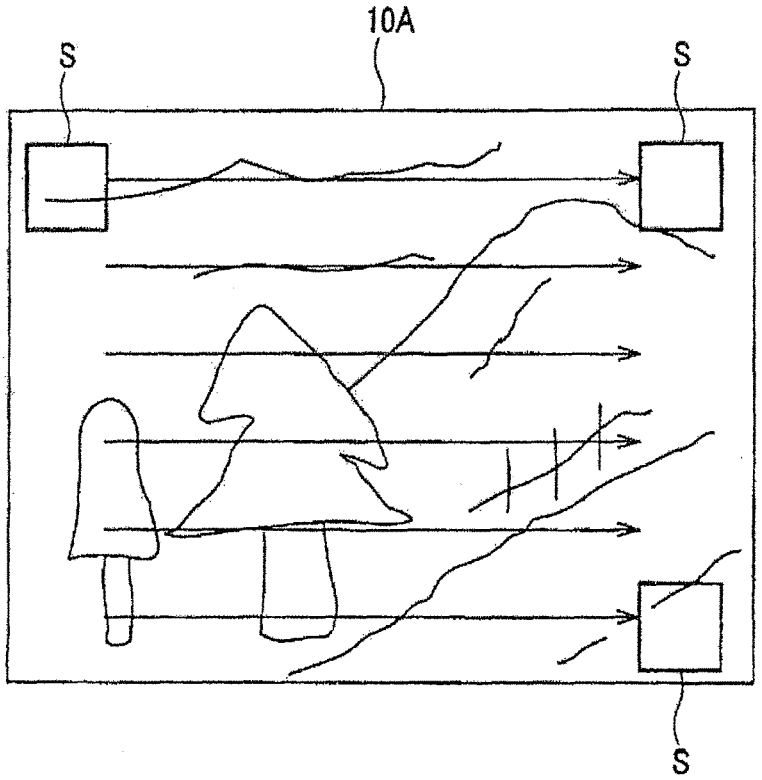
FIG. 7 is a schematic illustration of a scanning operation of the scanning section of the object detecting device of FIG. 5, scanning a search window.

As shown in FIG. 7, the scanning section 4 sequentially applies window 11 having a window size S that the downstream discriminator 5 accepts to the entire image (screen) 10A, that is given to it, and outputs the image (cut out image) obtained at each applied position of the input image 10A to the discriminator 5. While the window size S is fixed, the input image is sequentially scaled down by the scaling section 3 as described above and the image size of the input image is changed variously so that it is possible to detect an object of any size.

Figure 8:
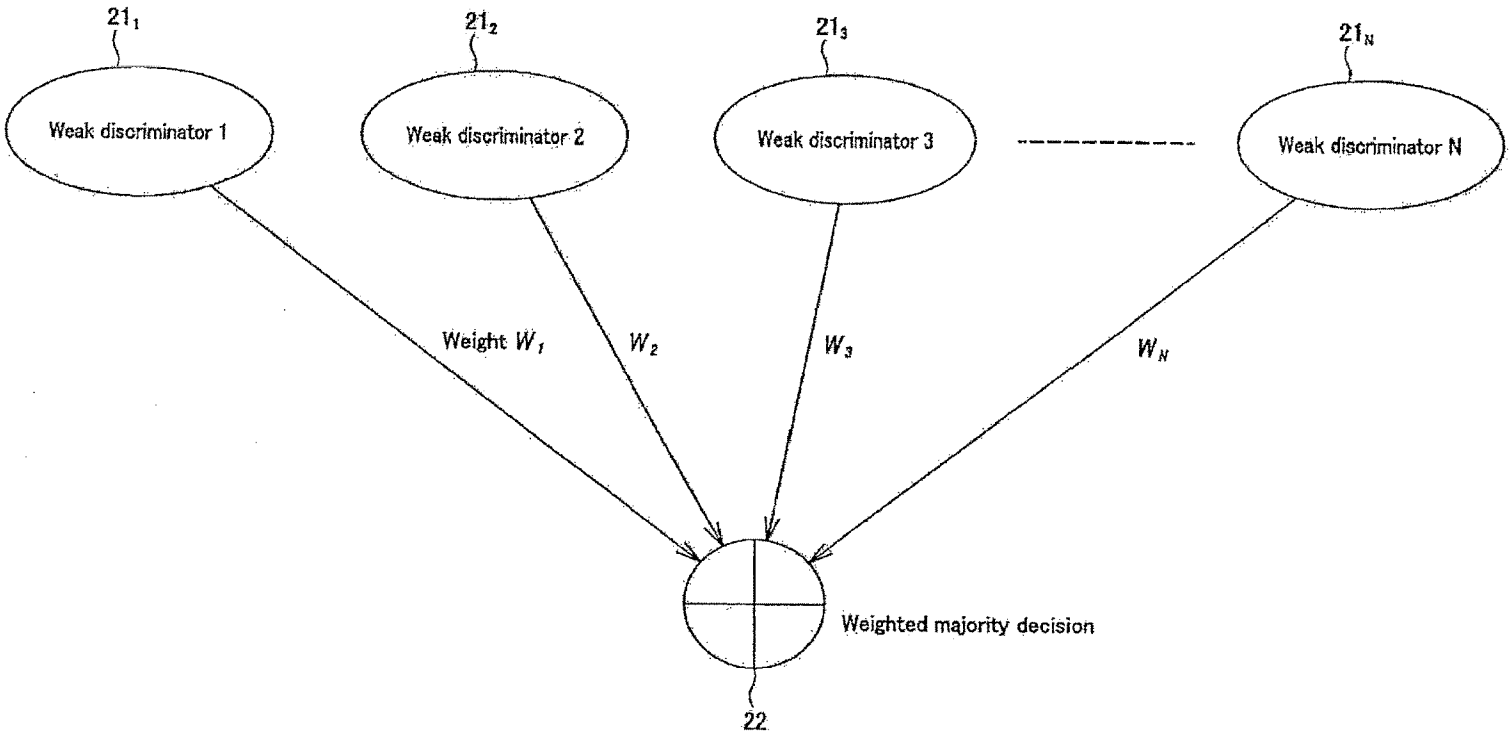
FIG. 8 is a schematic illustration of the arrangement of weak discriminators in the object detecting device of FIG. 5.

The discriminator 5 judges if the cut out image given from the upstream section is an object, e.g., a face, or not. As shown in FIG. 8, the discriminator 5 has a plurality of weak discriminators $\mathbf{21}_n$($\mathbf{21}_1$ through $\mathbf{21}_N$) acquired as a result of ensemble learning and an adder 22 for multiplying the outputs of the weak discriminators respectively by weights $W_n$ ($W_1$ through $W_N$) and determining a weighted majority decision. The discriminator 5 sequentially outputs estimates, each of which tells if the corresponding one of the weak discriminators $\mathbf{21}_n$($\mathbf{21}_1$ through $\mathbf{21}_N$) is an object or not for the input window image and the adder 22 computes and outputs the weighted majority decision. A judging means (not shown) judges if each is an object or not according to the value of weighted majority decision.

The group learning machine 6 is adapted to learn by group learning in advance the weak discriminators $\mathbf{21}_n$ and the weights by which the respective outputs (estimates) of the weak discriminators $\mathbf{21}_n$ are multiplied by means of a method, which will be described in greater detail hereinafter. Any group learning technique may be used for the purpose of the present invention so long as it can determine the result of the plurality of discriminators by majority decision. For example, a group learning technique using boosting such as AdaBoost that is adapted to weight data and make a weighted majority decision may be used.

Each of the weak discriminators $\mathbf{21}_n$ that constitute the discriminator 5 uses the difference between the luminance values of two pixels (inter-pixel difference characteristic) as characteristic quantity for the purpose of discrimination. When discriminating, it compares the characteristic quantity that is learnt in advance by means of a learning sample that is formed of a plurality of gradation images, each being labeled as object or non-object, and the characteristic quantity of the window image and outputs an estimate that indicates if the window image is an object or not decisively or as probability.

The adder 22 multiplies the estimates of the weak discriminators $\mathbf{21}_n$ by respective weights that show the reliabilities of the respective weak discriminations $\mathbf{21}_n$ and outputs the value obtained by adding them (value of weighted majority decision). In the case of AdaBoost, the weak discriminators $\mathbf{21}_n$ sequentially compute respective estimates so that the value of weighted majority decision is sequentially updated. The weak discriminators are sequentially generated by group learning by means of the group learning machine 6, using learning samples as described above and according to an algorithm, which will be described hereinafter. For instance, the weak discriminators generate estimates sequentially in the order of their generations. The weights of the weighted majority decision (reliabilities) are learnt in the learning step of generating the weak discriminators as will be described hereinafter.

The weak discriminators $\mathbf{21}_n$ judge if a window image is an object or not by dividing the inter-pixel difference characteristic by a threshold value if it is adapted to output a binary value as in the case of AdaBoost. A plurality of threshold values may be used for discrimination. Alternatively, the weak discriminators $\mathbf{21}_n$ may probabilistically output a continuous value that indicates the degree of likelihood of being an object on the basis of inter-pixel difference characteristics as in the case of Real-AdaBoost. The characteristic quantities (threshold values) that are necessary for the weak discriminators $\mathbf{21}_n$ are also learnt according to the above described algorithm in the learning session.

Furthermore, the suspension threshold value that is used at the time of weighted majority decision to suspend the computing operation without waiting until all the weak discriminators output the respective results of computations because the window image is judged to be a non-object in the course of the computing operation is also learnt in the learning session. As a result of such a suspension, it is possible to remarkably reduce the volume of computations in the process of detecting an object. Thus, it is possible to proceed to the operation of judging the next window image without waiting until all the weak discriminators outputs the respective results of computations.

Thus, the discriminator 5 computes the weighted majority decision as estimate for judging if a window image is an object or not and then operates as ajudging means for judging if the window image is an object or not according to the estimates. Additionally, each time an estimate is computed by the plurality of weak discriminators, which are generated in advance by learning and adapted to compute respective estimates and output them sequentially, the discriminator 5 updates the value of weighted majority decision obtained by multiplying each of the estimates by the reliability of the corresponding weak discriminator obtained as a result of the learning and adding the products of the multiplications. Then, each time the value of weighted majority decision (estimate) is updated, the discriminator 5 decides if the operation of computing the estimates is to be suspended or not by using the above described suspension threshold value.

The discriminator 5 is generated as the group learning machine 6 uses learning samples for group learning that is conducted according to a predetermined algorithm. Now, the group learning method of the group learning machine 6 will be described first and then the method of discriminating an object from an input image by using the discriminator 5 obtained as a result of group learning will be discussed.

(2) Group Learning Machine

The group learning machine 6 that uses a boosting algorithm for group learning is adapted to combine a plurality of weak discriminators so as to obtain a strong judgment by learning. Each weak discriminator is made to show a very simple configuration and hence has a weak ability for discriminating a face from a non-face. However, it is possible to realize a high discriminating ability by combining hundreds to thousands of such weak discriminators. The group learning machine 6 generates weak discriminators by using thousands of sample images, or learning samples, prepared from objects and non-objects, e.g., face images and non-face images, that are provided with respective correct answers and selecting (learning) a hypothesis out of a large number of learning models (a combination of hypotheses), according to a predetermined learning algorithm. Then, it decides the mode of combining weak discriminators. While each weak discriminator has a low discriminating ability by itself, it is possible to obtain a discriminator having a high discriminating ability by appropriately selecting and combining weak discriminators. Therefore, it is necessary for the group learning machine 6 to learn the mode of combining weak discriminators or selecting weak discriminators and weights to be used for making a weighted majority decision by weighting the output values of the weak discriminators.

Now, the learning method of the group learning machine 6 for obtaining a discriminator by appropriately combining a large number of weak discriminators, using a learning algorithm, will be described below. However, before describing the learning method of the group learning machine 6, the learning data that characterizes this embodiment out of the learning data to be used for group learning, more specifically the inter-pixel difference characteristic to be used for preparing weak discriminators, and the suspension threshold value to be used for suspending the object detecting operation of the discriminating step (detecting step) will be described.

(3) Configuration of Weak Discriminator

The discriminator 5 of this embodiment can make each of the weak discriminators it has output the result of discrimination in the discriminating step at high speed when the weak discriminator is made to discriminate a face from a non-face by means of the difference of the luminance values of two pixels (inter-pixel difference characteristic) selected from all the pixels contained in an image input to the weak discriminator. The image input to the weak discriminator is a learning sample in the learning step and a window image cut out from a scaling image in the discriminating step.

Figure 9:
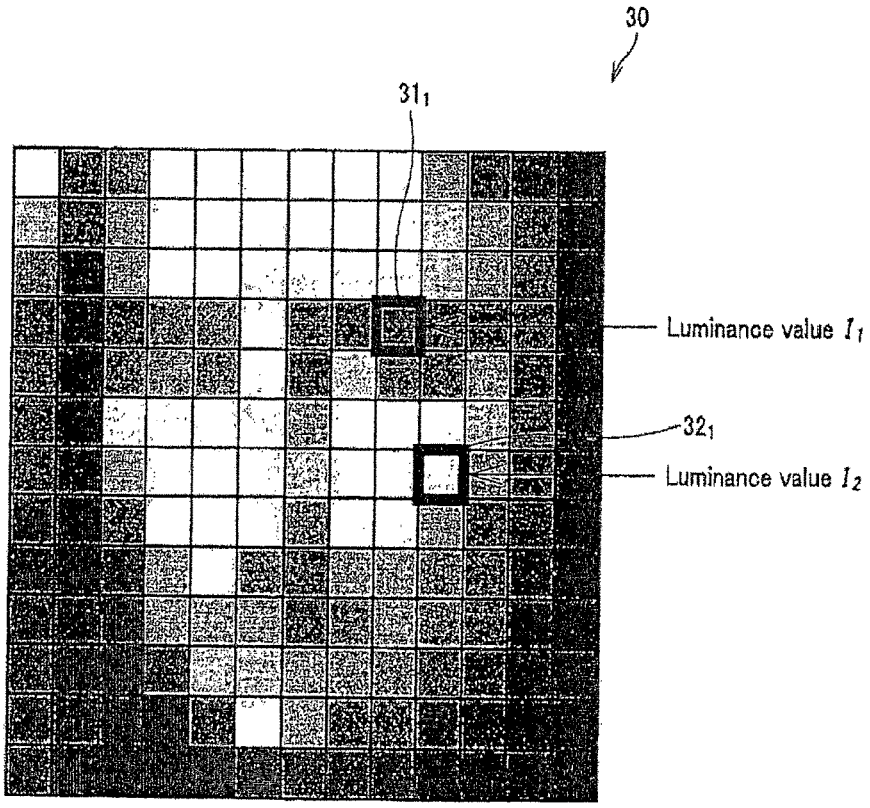
FIG. 9 is a schematic view of an image for illustrating the inter-pixel difference characteristic.

FIG. 9 is a schematic view of an image for illustrating the inter-pixel difference characteristic. Referring to FIG. 9 showing an image 30, the difference between the luminance values of two arbitrarily selected pixels, for example the difference between the luminance value $I_1$ of pixel 31 and the luminance value $I_2$ of pixel 32 as expressed by formula (2) below is defined as inter-pixel difference characteristic in this embodiment.

[Formula 2]

$$\text{inter-pixel difference characteristic: } d=I_1-I_2 \tag{2}$$

The ability of a weak discriminator depends on if its inter-pixel difference characteristic is used for detecting a face or not. Therefore, it is necessary to select a combination of pixel positions (to be also referred to as filter or weak hypothesis) contained in a cut out image so as to be used for weak discriminators.

For example, AdaBoost requires each weak discriminator to decisively output +1 (a object) or −1 (a non-object). Thus, in AdaBoost, a weak discriminator is generated by bisecting the inter-pixel difference characteristic at a pixel position, using one or more than one threshold values (+1 or −1).

In the case of the boosting algorithm of Real-AdaBoost or Gentle Boost, in which not a binary value but a continuous value (real number) is output to indicate the probability distribution of a learning sample, each weak discriminator outputs the probability telling if the input image is an object or not. Thus, the output of a weak discriminator may be decisive or in the form of probability. Firstly, weak discriminators of these two types will be discussed.

(3-1) Weak Discriminator Adapted to Output a Binary Value

A weak discriminator adapted to produce a decisive output makes a two class judgment on the object according to the inter-pixel difference characteristic. If the luminance values of two pixels located in the area of an image are $I_1$ and $I_2$ and the threshold value for judging if the image is an object or not by means of the inter-pixel difference characteristic is Th, it is possible to determine the class to which the image belongs depending on if it satisfies the requirement of formula (3) below or not.

[Formula 3]

$$I_1-I_2>Th \tag{3}$$

While each weak discriminator is required to select two pixel positions and a threshold value for them, the method for selecting them will be described hereinafter. The determination of the threshold value as indicated by the above formula (3) is the most simple case. For determining a threshold value, two threshold values expressed by formula (4) or formula (5) below may be used.

[Formula 4]

$$Th_1>I_1-I_2>Th_2 \tag{4}$$

[Formula 5]

$$I_1-I_2>Th_1 \text{ and } Th_2>I_2-I_2 \tag{5}$$

Figure 10A:
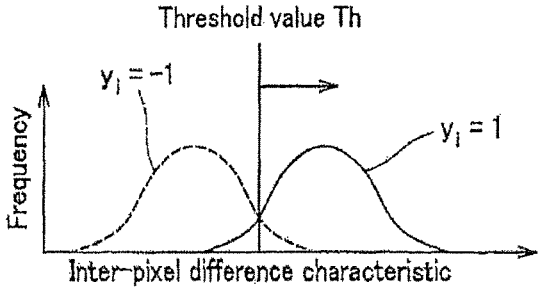
FIGS. 10A through 10C are schematic illustrations of the three discriminating techniques expressed by formulas (3) through (5) as shown hereinafter with characteristic instances of frequency distribution of data illustrated in graphs where the vertical axis represents frequency and the horizontal axis represents the inter-pixel difference characteristic.
Figure 10B:
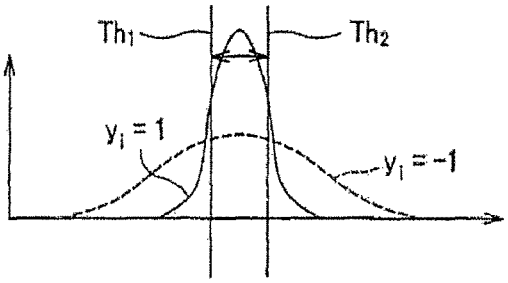
Figure 10C:
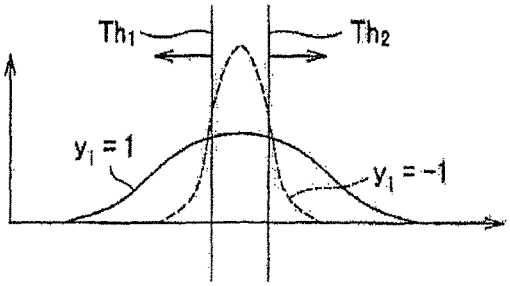

FIGS. 10A through 10C are schematic illustrations of the three discriminating techniques expressed by the formulas (3) through (5) above with characteristic instances of frequency distribution of data illustrated in graphs where the vertical axis represents frequency and the horizontal axis represents the inter-pixel difference characteristic. In the graphs, the data indicated by broken lines indicate the output values of all the learning samples that are expressed by $y_1=-1$ (non-object), whereas the data indicated by solid lines indicate the output values of all the learning samples that are expressed by $y_i=1$. Histograms as shown in FIGS. 10A through 10C are obtained by plotting the frequency of a same inter-pixel difference characteristic for learning samples including many face images and many non-face images.

When the histogram shows a normal distribution curve for the non-object data as indicated by a broken line and also another normal distribution curve for the object data as indicated by a solid line in FIG. 10A, the intersection of the curves is selected for the threshold value Th and hence it is possible to judge if the window image is an object or not by using the formula (3) above. For example, in AdaBoost, if the output of a weak discriminator is f(x), output f(x)=1 (object) or −1 (non-object). FIG. 10A shows an instance where a window image is judged to be an object when the inter-pixel difference characteristic is larger than the threshold value Th and hence the weak discriminator outputs f(x)=1.

When, on the other hand, the peaks of the two curves are found substantially at a same position but the distribution curves show different widths, it is possible to judge a window image to be an object or not by means of the above formula (4) or (5), using a value close to the upper limit value and a value close to the lower limit value of the inter-pixel difference characteristic of the distribution curve showing the smaller width. FIG. 10B shows an instance where the distribution curve with the smaller width is used to define the threshold values to be used for judging a window image to be an object, whereas FIG. 10C shows an instance where the distribution curve with the smaller width is removed from the distribution curve with the larger width to define the threshold values to be used for judging a window image to be an object. In both instances, the weak discriminator outputs f(x)=1.

While a weak discriminator is formed by determining an inter-pixel difference characteristic and one or two threshold values for it, it is necessary to select an inter-pixel difference characteristic that minimizes the error ratio of the judgment of the weak discriminator or maximizes the right judgment ratio. For instance, the threshold value(s) may be determined by selecting two pixel positions, determining a histogram for learning samples provided with correct answers as shown in FIGS. 10A through 10C, and searching for threshold values that maximize the correct answer ratio and minimize the wrong answer ratio (error ratio). Two pixel positions with the smallest error ratio that are obtained with threshold values may be selected. However, in the case of AdaBoost, each learning sample is provided with a weight (data weight) that reflects the degree of difficulty of discrimination so that an appropriate inter-pixel difference characteristic (showing the difference of the luminance values of the two pixels of appropriately selected positions) may minimize the weighted error ratio, which will be described in greater detail hereinafter.

(3-2) Weak Discriminator for Outputting a Continuous Value

Weak discriminators that produce an output in the form of probability include those used in Real-AdaBoost and Gentle Boost. Unlike a weak discriminator adapted to solve a discrimination problem by means of a predetermined constant value (threshold value) and output a binary value (f(x)=1 or −1) as described above, a weak discriminator of this type outputs the degree of likelihood of an object for the input image typically in the form of a probability density function.

The probability output indicating the degree of likelihood (probability) of an object is expressed by function f(x) of formula (6) below, where $P_p(x)$ is the probability density function of being an object of the learning sample and $P_n(x)$ is the probability density function of being a non-object of the learning sample.

[Formula 6]

$$\text{probability output of weak discriminator: } f(x) = P_p(x) - P_n(x) \tag{6}$$

Figure 11A:
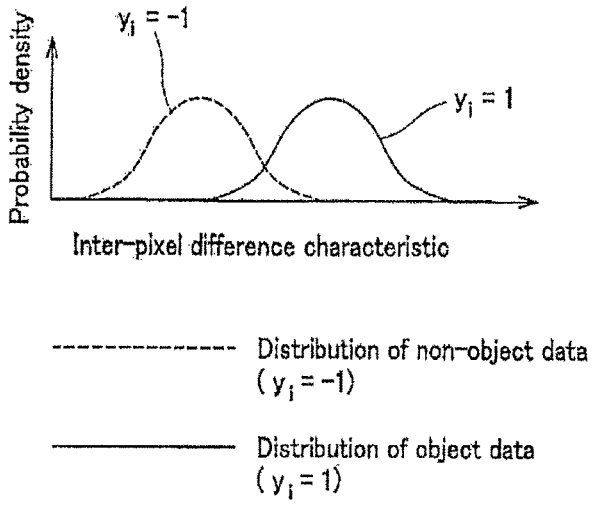
FIG. 11A is a graph illustrating a characteristic instance of frequency distribution of data, where the vertical axis represents the probability density and the horizontal axis represents the inter-pixel difference characteristic.
Figure 11B:
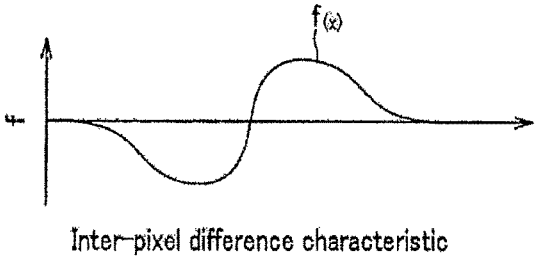
FIG. 11B is a graph illustrating the function f(x) of the frequency distribution of data of FIG. 11A, where the vertical axis represents the value of the function f(x) and the horizontal axis represents the inter-pixel difference characteristic.

FIG. 11A is a graph illustrating a characteristic instance of frequency distribution of data, where the vertical axis represents the probability density and the horizontal axis represents the inter-pixel difference characteristic. FIG. 11B is a graph illustrating the function f(x) of the frequency distribution of data of FIG. 11A, where the vertical axis represents the value of the function f(x) and the horizontal axis represents the inter-pixel difference characteristic. In FIG. 11A, the broken line indicates the probability function of being a non-object, whereas the solid line indicates the probability function of being an object. The graph of FIG. 11B is obtained by determining the function f(x) by means of the formula (6) above. The weak discriminator outputs the function f(x) that corresponds to the inter-pixel difference characteristic d indicated by the formula (2) above that is obtained from the input window image in the discriminating step. The function f(x) indicates the degree of likelihood of being an object. If, for example, an object is −1 and an object is 1, it can take a continuous value between −1 and 1. For instance, it may be so arranged as to store a stable of values of inter-pixel difference characteristic d and corresponding f(x) and read and output an f(x) from the table according to the input. Therefore, while this arrangement may require a memory capacity greater than the memory capacity for storing Th or $Th_1$ and $Th_2$ that are fixed values, it shows an improved discriminating ability.

The discriminating ability may be further improved by combining the above described estimation methods (discrimination methods) for use in ensemble learning. On the other hand, the processing speed can be improved by using only one of the methods.

This embodiment provides an advantage of being able to discriminate an object from a non-object at very high speed because it employs weak discriminators that use a very simple characteristic quantity (inter-pixel difference characteristic). When detecting an object that is a face, an excellent result of judgment can be obtained by using a threshold value that is determined by the method using the simplest formula (3) out of the above described discriminating methods for the inter-pixel difference characteristic. However, the selection of a discriminating method for the purpose of effectively exploiting weak discriminators may depend on the problem to be solved and hence an appropriate method may be used for selecting the threshold value(s). Depending on the problem, a characteristic quantity may be obtained not as the difference of the luminance values of two pixels but as the difference of the luminance values of more than two pixels or a combination of such differences.

(4) Suspension Threshold Value

Now, a suspension threshold value will be discussed. In a group learning machine using boosting, a window image is judged to be an object or not by way of a weighted majority decision that is the output of all the weak discriminators constituting the discriminator 5. The weighted majority decision is determined by sequentially adding the results (estimates) of discrimination of the weak discriminators. For example, if the number of weak discriminators is t (=1, . . . , K) and the weight (reliability) of majority decision that corresponds to each weak discriminator is $\alpha_t$, while the output of each weak discriminator is $f_t(x)$, the value of weighted majority decision F(x) in AdaBoost can be obtained by using formula (7) below.

[formula 7]

$$\text{value of weighted majority decision: } F(x) = \sum_t \alpha_t f_t(x) \tag{7}$$

Figure 12:
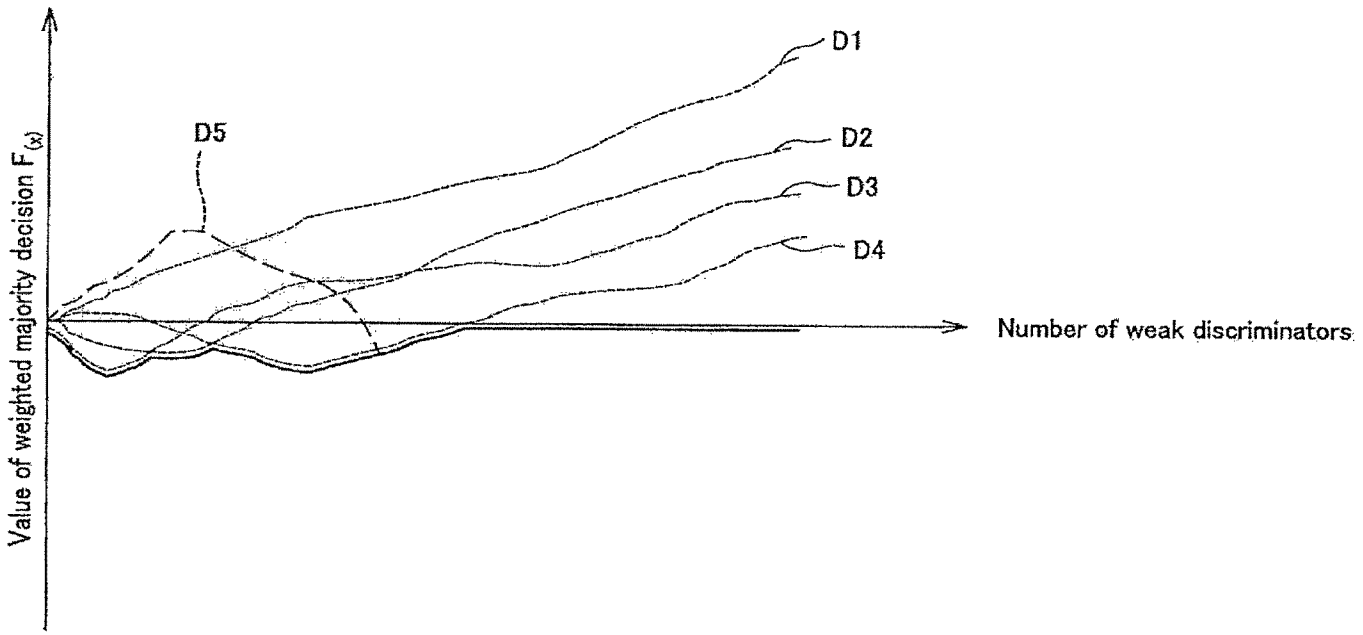
FIG. 12 is a graph illustrating the change in the value of weighted majority decision F(x) that accords with if the input image is an object or not, where the horizontal axis represents the number of weak discriminators and the vertical axis represents the value of weighted majority decision F(x)

FIG. 12 is a graph illustrating the change in the value of weighted majority decision F(x) that accords with if the input image is an object or not, where the vertical axis represents the number of weak discriminators and the horizontal axis represents the value of weighted majority decision F(x) as expressed by the formula (7) above. Referring to FIG. 12, the data indicated by solid lines D1 through D4 show the values of weighted majority decision F(x) that are sequentially determined by sequentially computing the estimates f(x) by means of the weak discriminators, using an image labeled as object as input. As shown by the data D1 through D4, when an object is used as input image for a certain number of weak discriminators, their weighted majority decision F(x) shows a positive value.

Here, a technique different from the ordinary boosting algorithm is introduced into this embodiment. With this technique, the process of sequentially adding the results of discrimination of weak discriminators is suspended for a window image that can be judged to be obviously a non-object before the time when all the results of discrimination are obtained from the weak discriminators. To do this, a threshold value to be used for determining a suspension of discrimination or not is learnt in advance in the learning step. The threshold value to be used for determining a suspension of discrimination or not is referred to as suspension threshold value hereinafter.

Due to the use of a suspension threshold value, it is possible to suspend the operation of the weak discriminators for computing their estimates f(x) for each window image if it can be reliably estimated to be a non-object without using the outputs of all the weak discriminators. As a result, the volume of computational operations can be remarkably reduced if compared with an occasion where all the weak discriminators are used to make a weighted majority decision.

The suspension threshold value may be the minimum value that the weighted majority decision can take for the learning sample that indicates the object of detection in the labeled learning samples. The results of the discriminating operations of the weak discriminators for the window image are sequentially weighted and output in the discriminating step. In other words, as the value of the weighted majority decision is sequentially updated and each time the suspension threshold value is updated and hence the result of discriminating operation of a weak discriminator is output, the updated value of the weighted majority decision and the updated suspension threshold value are compared and the window image is judged to be a non-object when the updated value of the weighted majority decision undergoes the suspension threshold value. Then, the computational process may be suspended to consequently eliminate wasteful computations and further raise the speed of the discriminating process.

More specifically, the minimum value of the weighted majority decision, that is obtained when the learning sample $X_J$, which is an object, is used out of the learning samples $x_i$(=$x_i$ through $X_N$) is selected for the suspension threshold value $R_K$ for the output $f_K(x)$ of the K-th weak discriminator, which is defined by formula (8) below.

[formula 8]

$$R_K = \min\left(\sum_{t=1}^{K} \alpha_t f_t(x_1), \sum_{t=1}^{K} \alpha_t f_t(x_2), \ldots, \sum_{t=1}^{K} \alpha_t f_t(x_J), 0\right) \quad (8)$$

As seen from the formula (8), when the minimum value of the weighted majority decision of the learning samples $x_i$ through $X_J$, which are objects, exceeds 0, 0 is selected for the suspension threshold value $R_K$. The minimum value of the weighted majority decision is made so as not to exceed 0 in AdaBoost that selects 0 as threshold value for discrimination. Therefore, the process of defining the threshold value may differ depending on the selected group learning technique. In the case of AdaBoost, the minimum value that all the data D1 through D4 that are obtained when an object is input as input image can take is selected for the suspension threshold as indicated by the thick line in FIG. 12 and, when the minimum value of all the data D1 through D4 exceeds 0, 0 is selected for the suspension threshold value.

In this embodiment, with the arrangement of learning the suspension threshold value $R_t$($R_i$ through $R_K$) each time a weak discriminator is generated, the estimates of a plurality of weak discriminators are sequentially output and the value of the weighted majority decision is sequentially updated. Then, the discriminating operations of the subsequent weak discriminators are omitted when the value undergoes the suspension threshold value as indicated by data D5 in FIG. 12. In other words, as a result of learning the suspension threshold value $R_t$, it is possible to determine if the computational operation of the next weak discriminator is to be carried out or not each time the estimate of a weak discriminator is computed so that the input image is judged to be a non-object without waiting until all the weak discriminators output the respective results of computations when it is obviously not an object and the computational process is suspended to raise the speed of the object detecting operation.

(5) Learning Method

Now, the learning method of the group learning machine 6 will be described. Images (training data) that are used as labeled learning samples (learning samples provided with correct answers) are manually prepared in advance as prerequisite for a pattern recognition problem of 2-class discrimination such as a problem of discriminating a face from a non-face in the given data. The learning samples include a group of images obtained by cutting out areas of an object to be detected and a group of random images obtained by cutting out areas of an unrelated object, which may be a landscape view.

A learning algorithm is applied on the basis of the learning samples to generate learning data that are used at the time of discriminating process. In this embodiment, the learning data to be used for the discriminating process include the following four sets of learning data that include the above described learning data.

(A) sets of two pixel positions (a total of K)

(B) threshold values of weak discriminators (a total of K)

(C) weights for weighted majority decision (reliabilities of weak discriminators) (a total of K)

(D) suspension threshold values (a total of K)

(5-1) Generation of Discriminator

Figure 13:
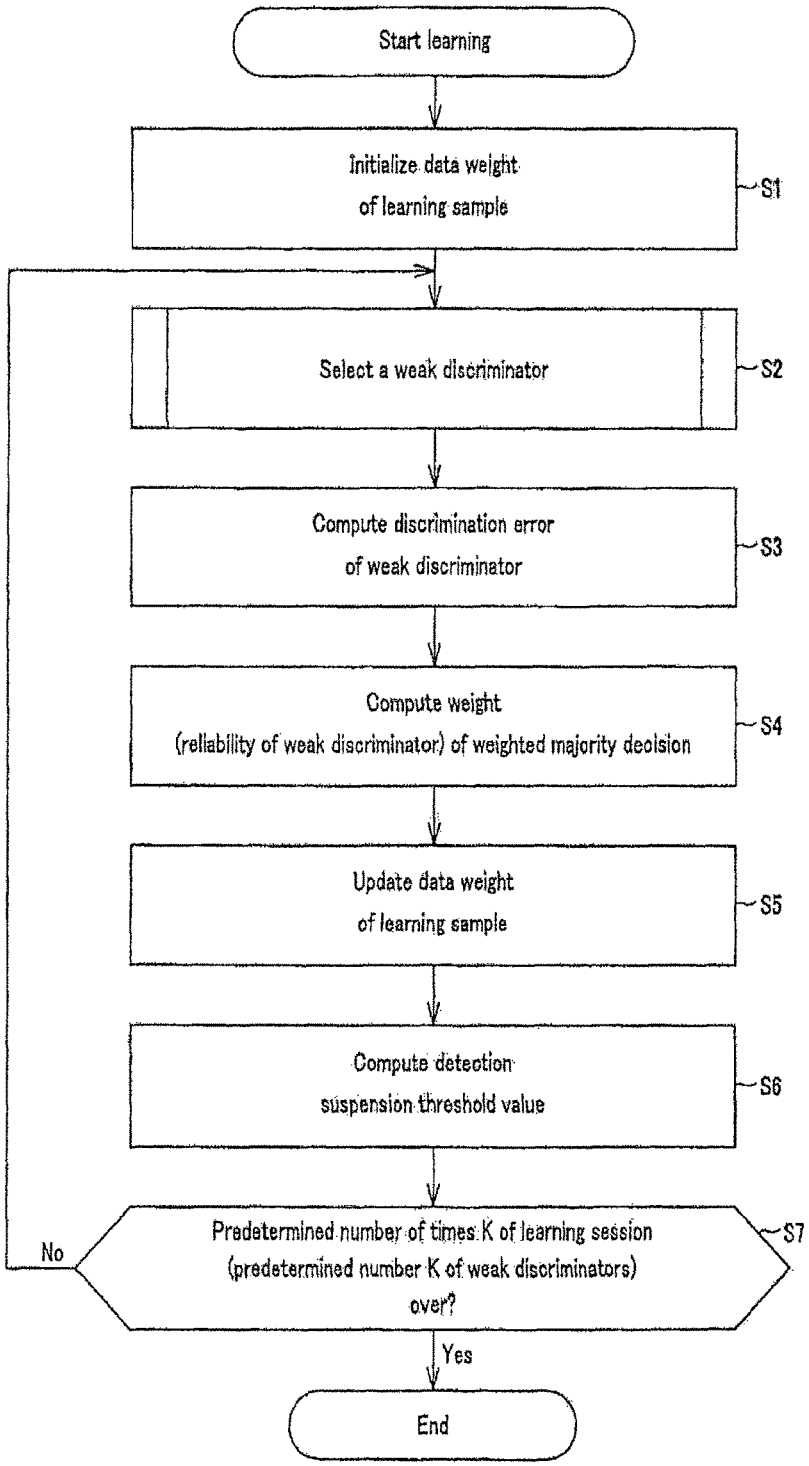
FIG. 13 is a flow chart illustrating the learning method of a group learning machine for obtaining weak discriminators in the object detecting device of FIG. 5.

Now, the algorithm for learning the four types of learning data (A) through (D) as listed above from the large number of learning samples as described above will be described. FIG. 13 is a flow chart illustrating the learning method of the group learning machine 6. While a learning process that uses a learning algorithm (AdaBoost) employing a fixed value as threshold value for weak discrimination is described here, the learning algorithm that can be used for this embodiment is not limited to that of AdaBoost and any other appropriate learning algorithm may alternatively be used so long as such a learning algorithm employs a continuous value that shows the probability of a solution as threshold value. For example, the learning algorithm for group learning of Real-AdaBoost designed for the purpose of combining a plurality of weak discriminators may be used.

(Step S0) Labeling of Learning Samples

Learning samples ($x_i$, $y_i$) that are labeled so as to show an object or non-object in advance are prepared in a manner as described above.

In the following description, the following notations are used.

learning samples ($x_i$, $y_i$):($x_1$, $y_1$), . . . , ($X_N$, $Y_N$)

$x_i \epsilon X$, $y_i \epsilon \{-1, 1\}$

X: data of learning samples

Y: labels (correct answers) of learning samples

N: number of learning samples

In other words, $x_i$ denotes a characteristic vector formed by all the luminance values of the learning sample images and $y_i$=−1 indicates a case where a learning sample is labeled as non-object, while $y_i$=1 indicates a case where a learning sample is labeled as object.

(Step S1) Initialization of Data Weight

For boosting, the weights of learning samples (data weights) are differentiated in such a way that the date weight of a learning sample that is hard to discriminate is made relatively large. While the result of discrimination of a weak discriminator is used to compute the error ratio for evaluating the weak discriminator, the evaluation of a weak discriminator that made an error in discriminating a relatively difficult learning sample will become lower than the proper evaluation for the achieved discrimination ratio when the result of discrimination is multiplied by a data weight. While the data weight is sequentially updated by the method as will be described hereinafter, the data weight of the learning sample is firstly initialized. The data weights of the learning samples are initialized so as to make the weights of all the learning samples equal to a predetermined value. The data weight is defined by formula (9) below.

[formula 9]

$$\text{data weight: } D_{1,i}=1/N \tag{9}$$

In the above formula, the data weight $D_{1,i}$ indicates that it is the data weight of learning sample $x_i$(=$x_1$, through $X_N$) at the number of times of repetition t=1 and N denotes the number of learning samples.

(Step S2 through S7) Repetition of Processing Operation

Then, the processing operation of Step S2 through S7 is repeated to generate a discriminator 5. The number of times of repetition of the processing operation t is made equal to t=1, 2, . . . , K. Each time the processing operation is repeated, a weak discriminator is generated and hence a pair of pixels and the inter-pixel difference characteristic for the positions of the pixels are leant. Therefore, as many weak discriminators as the number of times (K) of repetition of the processing operation are generated and a discriminator 5 is generated from the K weak discriminators. While hundreds to thousands of weak discriminators are normally generated as a result of repetition of the processing operation for hundreds to thousands times, the number of times of the processing operation (the number of the weak discriminators) t may be appropriately selected depending on the required level of discriminating ability and the problems (objects) to be discriminated.

(Step S2) Leaning of Weak Discriminators

Learning (generation) of weak discriminators takes place in Step S2 but the learning method to be used for it will be described in greater detail hereinafter. In this embodiment, a weak discriminator is generated each time the processing operation is repeated by means of the method that will be described hereinafter.

(Step S3) Computation of Weighted Error Ratio $e_t$

Then, the weighted error ratio of the weak discriminators generated in Step S2 is computed by using formula (10) below.

[formula 10]

$$\text{weighted error ratio: } e_t = \sum_{i:f_t(x_i)\neq y_i} D_{t,i} \tag{10}$$

As shown in the above formula (10), the weighted error ratio $e_t$ is obtained by adding the data weights of only the learning samples of which the results of discrimination of the weak discriminators are wrong ($f_t(x_i)\neq y_i$) out of all the learning samples. As pointed out above, the weighted error ratio $e_t$ is such that it is made to show a large value when weak discriminators make an error in discriminating a learning sample having a large data weight $D_{t,i}$ (a learning sample difficult to discriminate). The weighted error ratio $e_t$ is smaller than 0.5 but the reason for it will be described hereinafter.

(Step S4) Computation of Weight of Weighted Majority Decision (reliability of weak discriminator)

Then, the reliability $\alpha_t$ of the weight of weighted majority decision (to be referred to simply as reliability hereinafter) is computed by using formula (11) below on the basis of the weighted error ratio $e_t$ as computed by means of the above formula (10). The weight of weighted majority decision indicates the reliability $\alpha_t$ of the weak discriminator that is generated at the t-th time of repetition.

[formula 11]

$$\text{reliability: } \alpha_t = \frac{1}{2}\ln\left(\frac{1-e_t}{e_t}\right) \tag{11}$$

As clear from the above formula (11), a weak discriminator whose weighted error ratio $e_t$ is small can acquire a large reliability $\alpha_t$.

(Step S5) Updating of Data Weights of Learning Samples

Then, the data weights $D_{t,i}$ of the learning samples are updated by means of formula (12) below, using the reliabilities $\alpha_t$ obtained by using the above formula (11). The data weights $D_{t,i}$ are normalized ordinarily in such a way that the sum of adding them all is equal to 1. Formula (13) below is used to normalize the data weights $D_{t,i}$.

[formula 12]

$$\text{date weight: } D_{i+1,i}=D_{i,1}\exp(-\alpha_i y_i f_i(x_i)) \tag{12}$$

$$D_{t+1,i} = \frac{D_{t+1,i}}{\sum_i D_{t+1}} \tag{13}$$

(Step S6) Computation of Suspension Threshold Value $R_t$

Then, as described above, the threshold value $R_{ti}$ for suspending the discriminating operation of the discriminating step is computed. The smallest one of the values of the weighted majority decision of the learning samples (positive learning samples) $x_1$ through $x_J$ and 0 that are objects is selected for the suspension threshold value $R_t$ according to the above described formula (8). Note that the smallest value or 0 is selected for the suspension threshold value in the case of AdaBoost that is adapted to discriminating operations using 0 as threshold value. Anyway, the largest value that allows at least all the positive learning samples to pass is selected for the suspension threshold value $R_t$.

Then, in Step S7, it is determined if boosting is made to take place for the predetermined number of times (=K) and, if the answer to this question is negative, the processing operation from Step S2 to Step S7 is repeated. When boosting is made to take place for the predetermined number of times, the learning session is made to end. The process of repetition is terminated when the number of learnt weak discriminators is sufficient for discriminating objects from the images as objects of detection such as learning samples.

(5-2) Generation of Weak Discriminators

Figure 14:
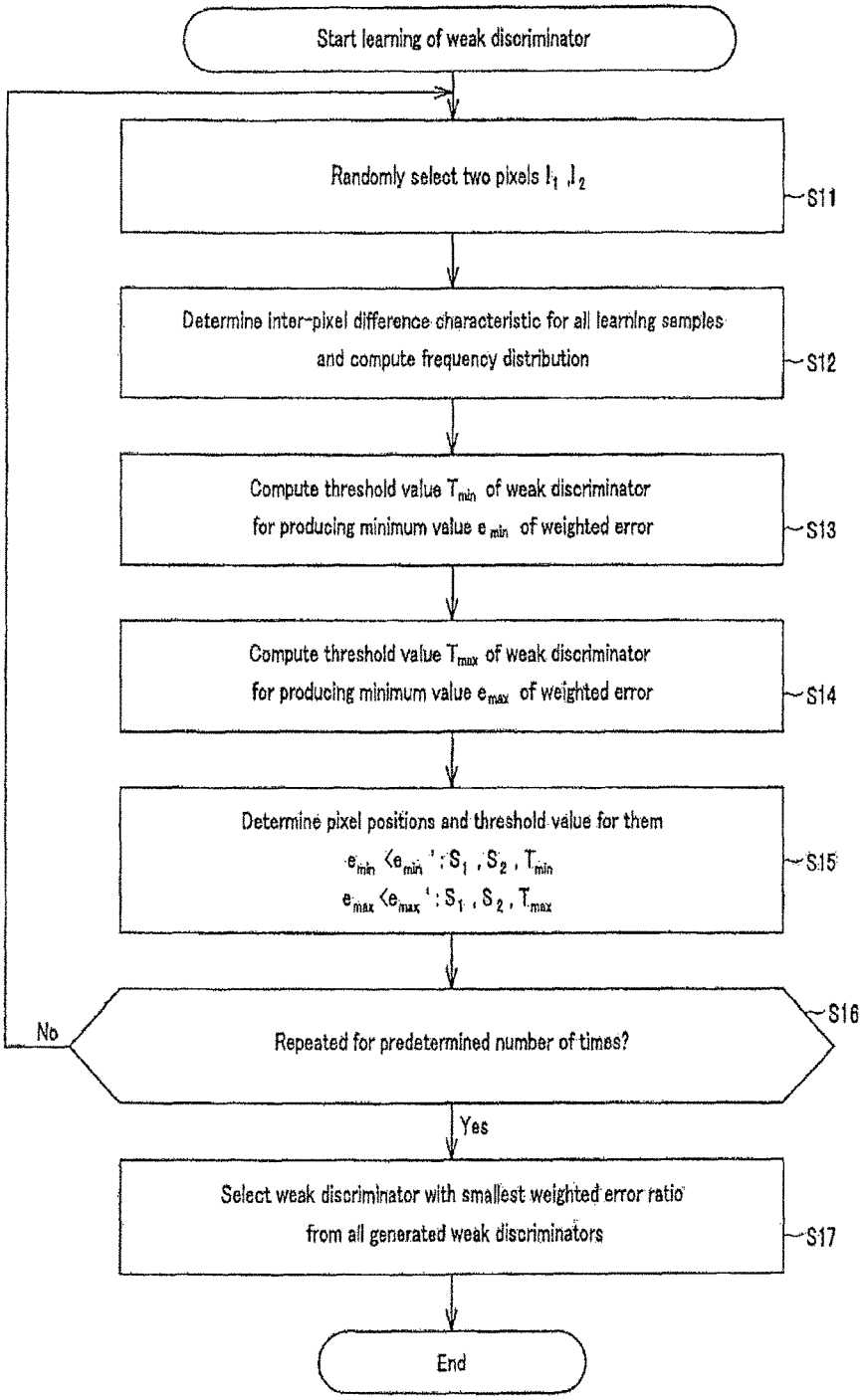
FIG. 14 is a flow chart illustrating the learning method (generating method) of a weak discriminator adapted to produce a binary output at a threshold value Th.

Now, the leaning method (generating method) of weak discriminators of above described Step S2 will be discussed below. The method of generating weak discriminators differs between when the weak discriminators are adapted to output a binary value and when they are adapted to output a continuous value as function f(x) expressed by the formula (6) above. Additionally, when the weak discriminators are adapted to output a binary value, it slightly differs between when they discriminate an object and a non-object by means of a single threshold value and when they discriminate an object and a non-object by means of two threshold values as shown in the formula (2) above. The learning method (generating method) of weak discriminators adapted to output a binary value at a single threshold value Th will be described below. FIG. 14 is a flow chart illustrating the learning method (generating method) of a weak discriminator adapted to produce a binary output at a threshold value Th.

(Step S11) Selection of Pixels

In this step, two pixels are arbitrarily selected from all the pixels of a learning sample. When, for example, a learning sample with 20×20 pixels is used, there are 400×399 different ways of selecting two pixels from that number of pixels and one of such ways will be selected. Assume here that the positions of the two pixels are $S_1$ and $S_2$ and the luminance values of the two pixels are $I_1$ and $I_2$.

(Step S12) Preparation of Frequency Distribution

Then, the inter-pixel difference characteristic d, which is the difference ($I_1$-$I_2$) of the luminance values of the two pixels selected in Step S11, is determined for all the learning samples and a histogram (frequency distribution) as shown in FIG. 10A is prepared.

(Step S13) Computation of Threshold Value $Th_{min}$

Thereafter, the threshold value $Th_{min}$ that minimizes the weighted error ratio $e_t$ ($e_{min}$) as shown in the above formula (10) is determined from the frequency distribution obtained in Step S12.

(Step S14) Computation of Threshold Value $Th_{max}$

Then, the threshold value $Th_{max}$ that maximizes the weighted error ratio $e_t$ ($e_{max}$) as shown in the above formula (10) is determined and inverts the threshold value by means of the method expressed by formula (14) below. In other words, each weak discriminator is adapted to output either of two values that respectively represent the right answer and the wrong answer depending on if the determined inter-pixel difference characteristic d is greater than the single threshold value or not. Therefore, when the weighted error ratio $e_t$ is smaller than 0.5, it can be made not smaller than 0.5 by the inversion.

[formula 13]

$$\left.\begin{aligned} e'_{max} &= 1 = e_{max} \\ I'_1 &= I_2 \\ I'_2 &= I_1 \\ Th'_{max} &= -Th_{max} \end{aligned}\right\} \tag{14}$$

(Step S15) Determination of Parameters

Finally, the parameters of each weak discriminator including the positions $S_1$ and $S_2$ of the two pixels and the threshold value Th are determined from the above $e_{min}$ and $e_{max}$'. More specifically, $S_1$, $S_2$, $Th_{min}$ when $e_{min}<e_{max}$'.

$S_1$'(=$S_2$), $S_2$'(=$S_1$), $Th_{min}$ when $e_{min}>e_{max}$'.

Then, in Step S16, it is determined if the processing operation has been repeated for the predetermined number of times M or not. If the processing operation has been repeated for the predetermined number of times, the operation proceeds to Step S17 and the weak discriminator that shows the smallest error ratio $e_t$ is selected out of the weak discriminators generated by the repetition of M times. Then the operation proceeds to Step S3 shown in FIG. 13. If, on the other hand, it is determined in Step S16 that the processing operation has not been repeated for the predetermined number of times, the processing operation of Steps S11 through S16 is repeated. In this way, the processing operation is repeated for m (=1, 2, . . . M) times to generate a single weak discriminator. While the weighted error ratio $e_t$ is computed in Step S3 of FIG. 13 in the above description for the purpose of simplicity, the error ratio $e_t$ of Step S3 is automatically obtained when the weak discriminator showing the smallest error ratio $e_t$ is selected in Step S17.

While the data weight $D_{t,\ i}$ determined in Step S5 as a result of repeating the processing operation is used to learn the characteristic quantities of a plurality of weak discriminators and the weak discriminator showing the smallest error ratio as indicated by the above formula (10) is selected from the weak discriminators (weak discriminator candidates) in this embodiment, the weak discriminator may alternatively be generated by arbitrarily selecting pixel positions from a plurality of pixel positions that are prepared or learnt in advance. Still alternatively, the weak discriminator may be generated by using learning samples different from the learning samples employed for the operation of repeating Steps S2 through S7. The weak discriminators and the discriminator that are generated may be evaluated by bringing in samples other than the learning samples as in the case of using a cross-validation technique or a jack-knife technique. A cross-validation technique is a technique by which a learning sample is equally divided into I samples and a learning session is conducted by using them except one and the result of the learning session is evaluated by the remaining one. Then, the above operation is repeated for I times to finalize the evaluation of the result.

When, on the other hand, each weak discriminator uses two threshold values $Th_1$ and $Th_2$ as indicated by the above formula (4) or (5), the processing operation of Steps S13 through 15 shown in FIG. 14 is slightly modified. When only a single threshold value Th is used as indicated by the above formula (3), the error ratio can be inverted if it is greater than 0.5. However, in a case where the right answer is given for discrimination when the inter-pixel difference characteristic is greater than the threshold value $Th_2$ and smaller than the threshold value$Th_1$ as indicated by the formula (4), the right answer is given for discrimination when the inter-pixel difference characteristic is smaller than the threshold value $Th_2$ or greater than the threshold value $Th_1$ as indicated by the formula (5). In short, the formula (5) is the inversion of the formula (4), whereas the formula (4) is the inversion of the formula (5).

When a weak discriminator outputs the result of discrimination by using two threshold values $Th_1$ and $Th_2$, the frequency distribution of inter-pixel difference characteristics is determined in Step S12 shown in FIG. 14 and then the threshold values $Th_1$ and $Th_2$ that minimize the error ratio $e_t$ are determined. Thereafter, it is determined if the processing operation is repeated for the predetermined number of times as in Step S16. After the repetition of the processing operation for the predetermined number of times, the weak discriminator that shows the smallest error ratio is adopted from all the generated weak discriminators.

In the case of weak discriminators adapted to output a continuous value as indicated by the above formula (6), firstly two pixels are randomly selected as in Step S1 of FIG. 14 and the frequency distribution is determined for all the learning samples. Then, the function f(x) as shown in the above formula (6) is determined on the basis of the obtained frequency distribution. Then, a series of operations of computing the error ratio according to a predetermined algorithm, which is adapted to output the likelihood of being an object (and hence the right answer) for the output of the weak discriminator, is repeated for a predetermined number of times and a weak discriminator is generated by selecting the parameter showing the smallest error ratio (the highest correct answer ratio).

When a learning sample of 20×20 pixels is used to generate a weak discriminator, there are a total of 159,000 ways of selecting two pixels from that number of pixels. Therefore, the one that shows the smallest error ratio may be adopted for the weak discriminator after repeating the selecting process for M=159,000 times at most. While a highly performable weak discriminator can be generated when the selecting process is repeated for the largest possible number of times and a weak discriminator that shows the smallest error ratio is adopted as described above, a weak discriminator that shows the smallest error ratio may be adopted after repeating the selecting process for a number of times less than the largest possible number of times, e.g., hundreds times.

(6) Object Detecting Method

Figure 15:
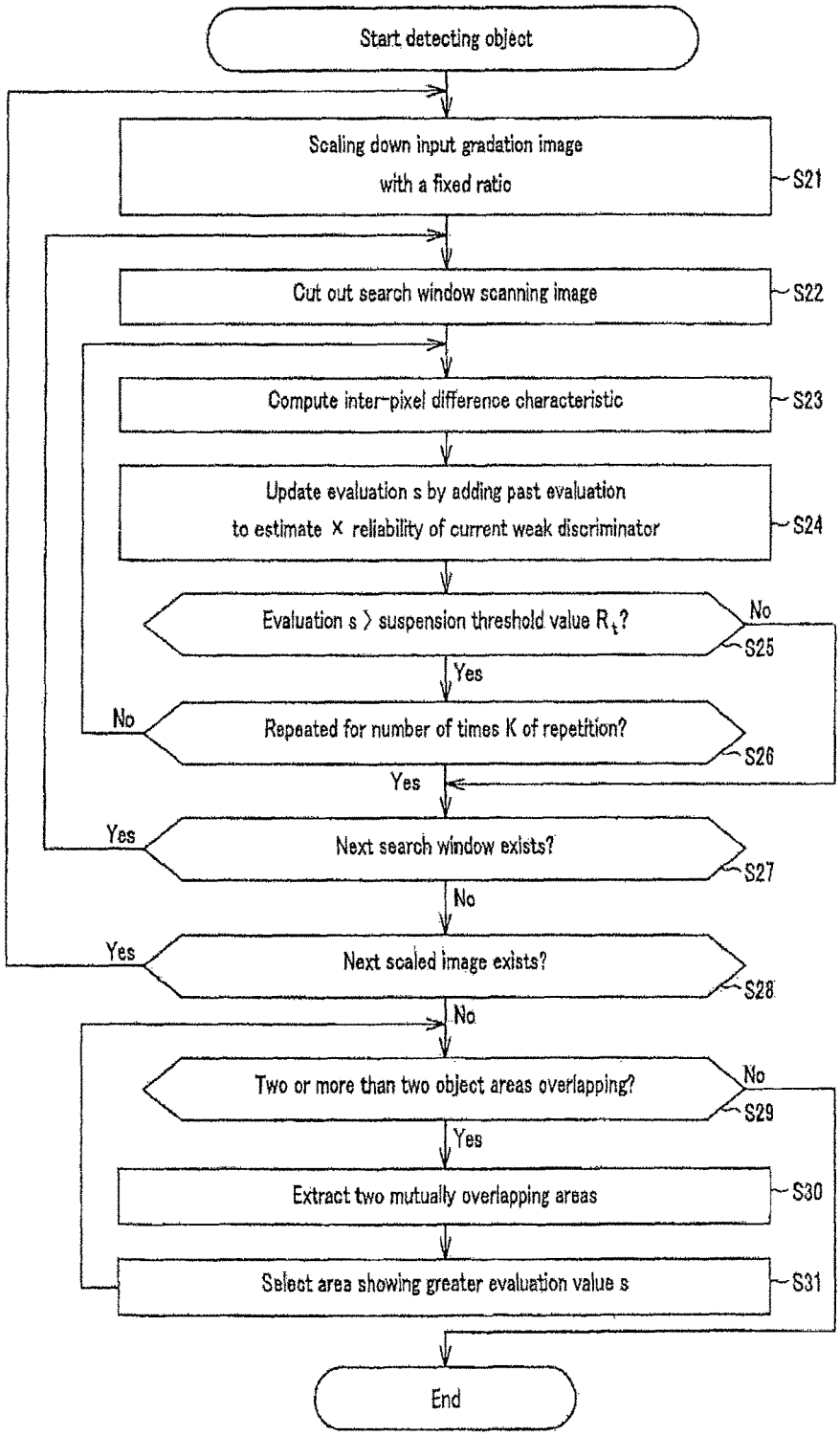
FIG. 15 is a flow chart illustrating the object detecting method of the object detecting device of FIG. 5.

Now, the object detecting method of the object detecting device illustrated in FIG. 5 will be described below. FIG. 15 is a flow chart illustrating the object detecting method of the object detecting device of FIG. 5. For detecting on object (discriminating step), the discriminator 5 that is formed by utilizing the weak discriminators generated in a manner as described above is used so as to detect an object out of an input image according to a predetermined algorithm.

(Step S21) Generation of Scaled Image

The scaling section 3 as shown in FIG. 5 scales down the gradation image given from the image output section 2 to a predetermined ratio. It may be so arranged that a gradation image is input to the image output section 2 as input image and the image output section 2 converts the input image into a gradation image. The image given to the scaling section 3 from the image output section 2 is output without scale conversion and a scaled image that is downscaled is output at the next or subsequent timing. The images output from the scaling section 3 are collectively referred to as scaled image. A scaling image is generated when the operation of detecting a face from all the area of the scaled image that is output last time is completed and the operation of processing the input image of the next frame starts when the scaled image becomes smaller than the window image.

The scanning section 4 shown in FIG. 5 scans the image that is subjected to scale conversion at the search window and then outputs a window image.

(Steps S23, S24) Computation of Evaluation Value s

Then, it is judged if the window image output from the scanning section 4 is an object or not. The discriminator 5 sequentially adds weights to the respective estimates f(x) of the above described plurality of weak discriminators to obtain the updated value of the weighted majority decision as evaluation value s. Then, it is judged if the window image is an object or not according to the evaluation value s and also if the discriminating operation is to be suspended or not.

Firstly, as a window image is input, its evaluation value s is initialized to s=0. The first stage weak discriminator $\mathbf{21}_1$ of the discriminator 5 computes the inter-pixel difference characteristic $d_t$ (Step S23). Then, the estimate value output from the weak discriminator $\mathbf{21}_1$ is reflected to the above evaluation value s (Step S24).

As described above by referring to the formulas (3) through (5), a weak discriminator that outputs a binary value as estimate value and a weak discriminator that outputs a function f(x) as estimate value differs from each other in terms of the way of reflecting the estimate to the evaluation value s.

Firstly, when the above formula (2) is used to a weak discriminator that outputs a binary value as evaluation value, the evaluation value s is expressed by formula (15) below.

[formula 14]

$$\text{evaluation value}: s \leftarrow s + \begin{cases} \alpha_t \ \ldots \ \mathrm{Th}_{t,1} < d_t \\ -\alpha_t \ \ldots \ \text{otherwise} \end{cases} \tag{15}$$

When the above formula (3) is used to a weak discriminator that outputs a binary value as evaluation value, the evaluation value s is expressed by formula (16) below.

[formula 15]

$$\text{evaluation value}: s \leftarrow s + \begin{cases} \alpha_t \ \ldots \ \mathrm{Th}_{t,1} < d_t, \mathrm{Th}_{t,2} \\ -\alpha_t \ \ldots \ \text{otherwise} \end{cases} \tag{16}$$

When the above formula (4) is used to a weak discriminator that outputs a binary value as evaluation value, the evaluation value s is expressed by formula (17) below.

[formula 16]

$$\text{evaluation value}: s \leftarrow s + \begin{cases} \alpha_t \ \ldots \ d_t < \mathrm{Th}_{t,1} \text{ and } \mathrm{Th}_{t,2} < d_t \\ -\alpha_t \ \ldots \ \text{otherwise} \end{cases} \tag{17}$$

Finally, when the above formula (5) is used to a weak discriminator that outputs a function f as evaluation value, the evaluation value s is expressed by formula (18) below.

[Formula 17]

$$\text{evaluation value: } s \leftarrow s + f(d) \tag{18}$$

(Steps S25, S26) Judgment of Suspension

Then, the discriminator 5 determines if the evaluation value s obtained (updated) by any of the above described four techniques is greater than the suspension threshold value $R_t$ or not. If it is determined that the evaluation value s is the threshold value $R_t$, it is then determined if the processing operation has been repeated to the predetermined number of times (=K times) or not (Step S26). If it is determined that the processing operation has not been repeated for the predetermined number of times, the processing from Step S23 is repeated.

If, on the other hand, it is determined that the processing operation has been repeated for the predetermined number of times (=K times), the operation proceeds to Step S27 when the evaluation s is smaller than the suspension threshold value $R_t$, where it is determined if the window image is an object or not according to if the obtained evaluation value s is greater than 0 or not. If it is determined that the window image is an object, the current window position is stored and it is determined if there is the next search window or not (Step S27). If it is determined that there is the next search window, the processing operation from Step S22 is repeated. If, on the other hand, all the search windows have been scanned for all the next area, the processing operation proceeds to Step S28, where it is determined if there is the next scaled image or not. If it is determined that there is no next scaled image, the processing operation proceeds to Step S29, where the overlapping area is removed. If, on the other hand, it is determined that there is the next scaled image, the processing operation from Step S21 is repeated. The scaling operation of Step S21 is terminated when the scaled image becomes smaller than the window image.

(Steps S29 through S31) Removal of Overlapping Area

When all the scaled images are processed for a single input image, the processing operation moves to Step S29. In the processing operation from Step S29 on, one of the areas in an input image that are judged to be objects and overlapping with each other, if any, is removed. Firstly, it is determined if areas that are overlapping with each other or not and, if it is determined that there are a plurality of areas stored in Step S26 and any of them are overlapping, the processing operation proceeds to Step S30, where the two overlapping areas are taken out and one of the areas that shows a smaller evaluation value s is removed as it is regarded to show a low reliability and the area that shows a greater evaluation value is selected for use (Step S29). Then, the processing operation from Step S29 is repeated once again. As a result, of the areas that are extracted for a plurality of times to overlap with each other, a single area that shows the highest evaluation value is selected. When there are not two or more than two object areas that overlap with each other and when there is no object area, the processing operation on the input image is terminated and the processing operation on the next frame starts.

As described above in detail, with the object detecting method of this embodiment, it is possible to process each window image to detect a fact from the image at very high speed on a real time basis because the operation of computing the characteristic quantity of the object in the above described Step S23 is terminated simply by reading the luminance values of two corresponding pixels of the window image, using a discriminator that has learnt by group learning the weak discriminators that weakly discriminate an object and a non-object by way of the inter-pixel difference characteristic of the image. Additionally, each time the evaluation value s is updated by multiplying the result of discrimination (estimate) obtained from the characteristic quantity by the reliability of the weak discriminator used for the discrimination and adding the product of multiplication, the updated evaluation value s is compared with the suspension threshold value $R_t$ to determine if the operation of computing the estimates of the weak discriminators is to be continued or not. When the evaluation value s falls below the suspension threshold value $R_t$, the computing operation of the weak discriminators is suspended to proceed to the operation of processing the next window image so that it is possible to dramatically reduce wasteful computing operations to further improve the speed of detecting a face. When all the areas of the input image and the scaled images obtained by scaling down the input image are scanned to cut out window images, the probability of being an object of each window image is very small and most of the window images are non-objects. As the operation of discriminating an object and a non-object in the window images, which are mostly non-objects, is suspended on the way, it is possible to dramatically improve the efficiency of the discriminating step. If, to the contrary, the window images include many objects to be detected, a threshold value similar to the above described suspension threshold value may be provided to suspend the computing operation using the window images that are apparently objects. Furthermore, it is possible to detect objects of any size by scaling the input image by means of the scaling section to define a search window of an arbitrarily selected size.

(7) Example

Now, the present invention will be described further by way of an example where a face was actually detected as object. However, it may be needless to say that the object is not limited to a face and it is possible to detect any object other than the face of a man that shows characteristic features on a two-dimensional plane such as a logotype or a pattern and can be discriminated to a certain extent by the inter-pixel difference characteristic thereof as described above (so that it can constitute a weak discriminator).

Figure 16B:
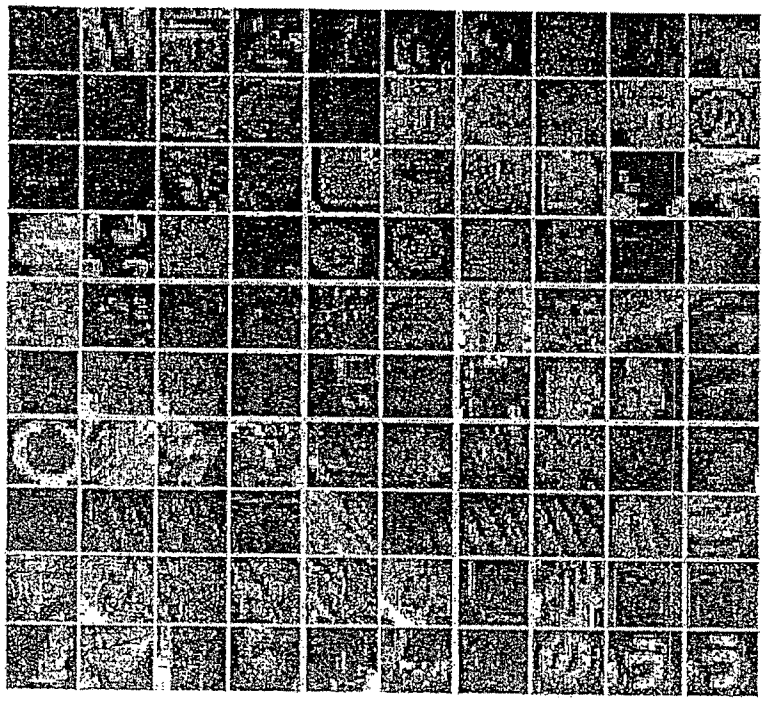
FIGS. 16A and 16B illustrate part of the learning samples used in an example of the invention.
Figure 16A:
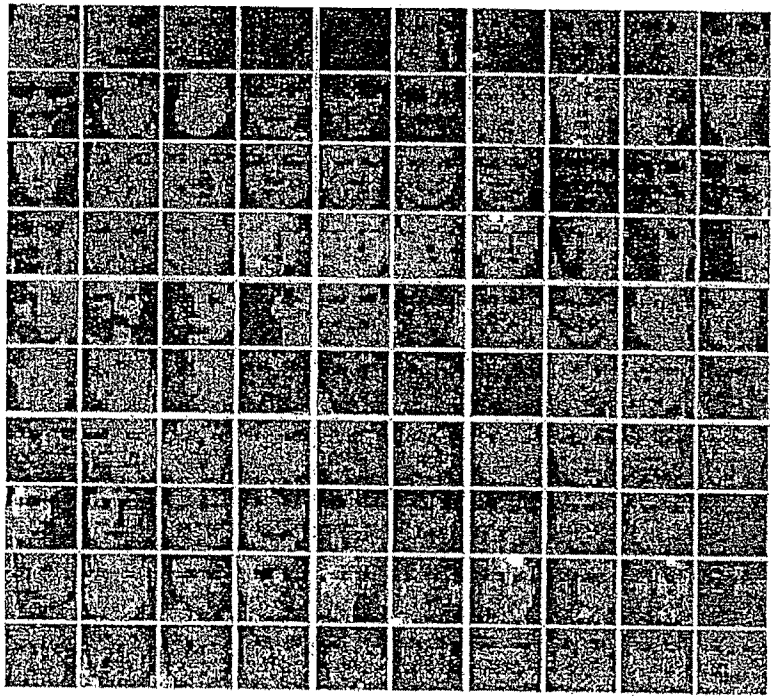

FIGS. 16A and 16B illustrate part of the learning samples used in this example. The learning samples include a face image group labeled as objects as shown in FIG. 16A and a non-face image groups labeled as non-objects as shown in FIG. 16B. While FIGS. 16A and 16B show only part of the images that were used in this example, the learning samples typically includes thousands of face images and tens of thousands of non-face images. The image size may typically be such that each image contains 20×20 pixels.

Figure 17A:
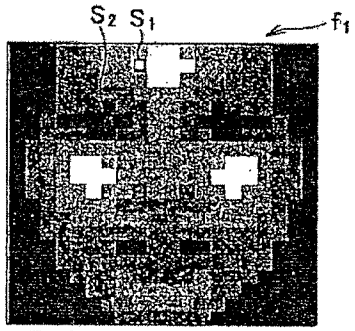
FIGS. 17A through 17F are schematic illustrations of the first through sixth weak discriminators that are generated first as a result of learning at the group learning machine of FIG. 13.
Figure 17B:
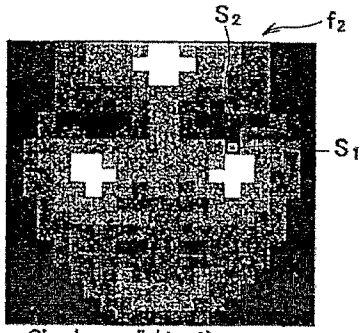
Figure 17C:
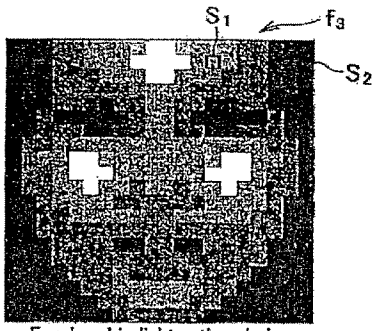
Figure 17D:
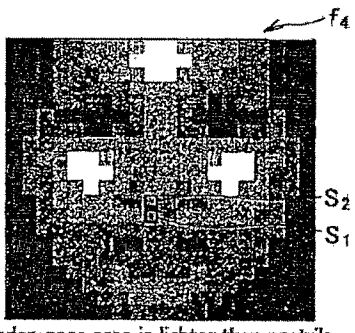
Figure 17E:
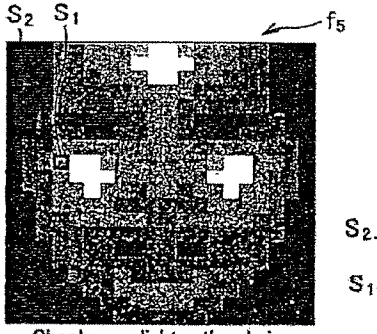
Figure 17F:
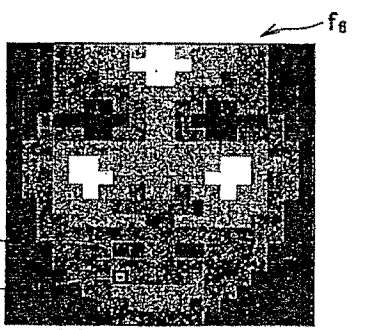

In this example, face discrimination problems were learnt from the learning samples according to the algorithm illustrated in FIGS. 13 and 14 and using only the above described formula (3). FIGS. 17A through 17F illustrate the first through sixth weak discriminators that were generated as a result of the learning session. Obviously, they show features of a face very well. Qualitatively, the weak discriminator $f_1$ of FIG. 17A shows that the forehead ($S_1$) is lighter than the eyes ($S_1$) (threshold value: 18.5) and the weak discriminator $f_2$ of FIG. 17B shows that the cheeks ($S_1$) is lighter than the eyes ($S_2$) (threshold value: 17.5), while the weak discriminator $f_3$ of FIG. 17C shows that the forehead ($S_1$) is lighter than the hair ($S_2$) (threshold value: 26.5) and the weak discriminator $f_4$ of FIG. 17D shows that the area under the nose ($S_1$) is lighter than the nostrils ($S_2$) (threshold value: 5.5. Furthermore, the weak discriminator $f_5$ of FIG. 17E shows that the cheeks ($S_1$) is lighter than the hair ($S_2$) (threshold value: 22.5) and the weak discriminator $f_6$ of FIG. 17F shows that the chin $S_1$ is lighter than the lips ($S_2$) (threshold value: 4.5).

In this example, a correct answer ratio of 70% (performance relative to the learning samples) was achieved by the first weak discriminator $f_1$. The correct answer ratio rose to 80% when all the weak discriminators $f_1$ through $f_6$ were used. The correct answer ratio further rose to 90% when 40 weak discriminators were combined and to 99% when 765 weak discriminators were combined.

Figure 18A:
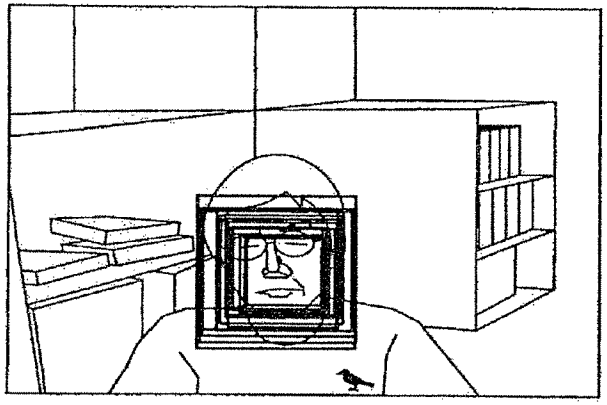
FIGS. 18A and 18B are schematic illustrations of the result of a face detecting operation obtained from a single input image, showing respectively before and after the removal of an overlapping area.
Figure 18B:
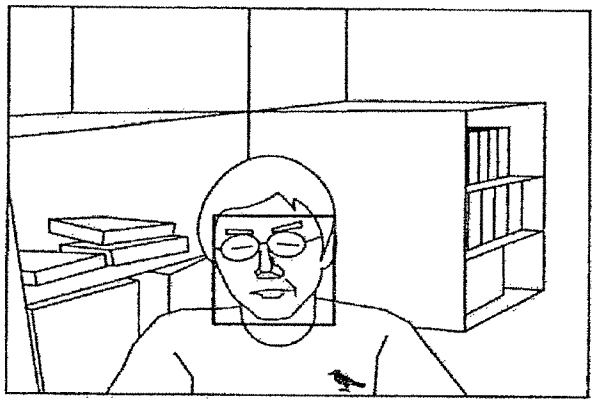

FIGS. 18A and 18B are schematic illustrations of the result of a face detecting operation obtained from a single input image, showing respectively before and after the removal of an overlapping area. The plurality of frames shown in FIG. 18A indicate the detected face (object). A number of faces (areas) are detected from a single image by the processing operation from Step S21 through Step S28. It is possible to detect a single face by carrying out the process of removing unnecessary overlapping areas from Step S29 to Step S31. It will be appreciated that, when two or more than two faces exist in an image, they can be detected simultaneously. The operation of detecting a face in this example can be conducted at very high speed so that it is possible to detect faces from about thirty input images per second if a PC is used. Thus, it is possible to detect faces from a moving picture.

The present invention is by no means limited to the above described embodiment, which may be modified and altered in various different ways without departing from the scope of the present invention.

What is claimed is:

[1. An object detecting device for detecting if a given grayscale image is an object, the device comprising:

a plurality of weak discriminating means for computing an estimate indicating that the grayscale image is an object or not according to a characteristic quantity that is equal to the difference of the luminance values of two pixels at two different positions; and a discriminating means for judging if the grayscale image is an object according to the estimate computed by one of or the estimates computed by more than one of the plurality of weak discriminating means.]

[2. The device according to claim 1, wherein the discriminating means computes the value of the weighted majority decision by multiplying each of the estimates by the reliability of the corresponding weak discriminating means obtained as a result of the learning and adding the products of the multiplications and judges if the grayscale image is an object according to the majority decision value.]

[3. The device according to claim 2, wherein the plurality of discriminating means compute estimates sequentially; and wherein the discriminating means sequentially updates the value of weighted majority decision each time when an estimate is computed and controls the object detecting operation of the device so as to judge if the computation of estimates is suspended according to the updated value of weighted majority decision.]

[4. The device according to claim 3, wherein the discriminating means is configured to suspend the operation of computing estimates depending on if the value of weighted majority decision is smaller than a suspension threshold value; and wherein the weak discriminating means are sequentially generated by ensemble learning, using a leaning sample of a plurality of grayscale images provided with respective correct answers telling if each of the grayscale images is an object;

wherein the suspension threshold value being the minimum value in the values of weighted majority decision updated by adding the weighted reliabilities to the respective estimates of the learning samples of the objects, as computed each time a weak discriminating means is generated in the learning session by the generated weak discriminating means.]

[5. The device according to claim 4, wherein, if the minimum value in the values of the weighted majority decision obtained in the learning session is positive, 0 is selected as the suspension threshold value.]

[6. The device according to claim 1, wherein each of the weak discriminating means decisively outputs its estimate by computing the estimate as binary value indicating if the grayscale image is an object depending on if the characteristic quantity is smaller than a predetermined threshold value.]

[7. The device according to claim 1, wherein each of the weak discriminating means outputs the probability that the grayscale image is an object as computed on the basis of the characteristic quantity so as to decisively output its estimate.]

[8. The object detecting device according to claim 1, wherein the object is a face.]

[9. The object detecting device according to claim 1, wherein the object is a characteristic of a face.]

[10. The object detecting device according to claim 1, wherein the object is a particular gender.]

[11. The object detecting device according to claim 1, wherein the object is either an adult or a child.]

[12. An object detecting method for detecting if a given grayscale image is an object, the method comprising:

a weak discriminating step of computing an estimate indicating that the grayscale image is an object or not according to a characteristic quantity that is equal to the difference of the luminance values of two pixels at two different positions that is learned in advance for each of a plurality of weak discriminators; and a discriminating step of judging if the grayscale image is an object according to the estimate computed by one of or the estimates computed by more than one of the plurality of weak discriminators.]

[13. The method according to claim 12, wherein the value of the weighted majority decision is computed by multiplying each of the estimates by the reliability of the corresponding weak discriminator obtained as a result of the learning and adding the products of the multiplications and it is judged if the grayscale image is an object according to the majority decision value in the discriminating step.]

[14. The method according to claim 13, wherein estimates are computed sequentially by the plurality of weak discriminators in the weak discriminating step; and the value of weighted majority decision is updated each time when an estimate is computed in the discriminating step;

the method further comprising:

a control step of judging if the computation of estimates is suspended according to the value of weighted majority decision updated in the discriminating step.]

[15. An ensemble learning device for ensemble learning using learning samples of a plurality of grayscale images provided with respective correct answers telling if each of the grayscale images is an object, the device comprising:

a learning means for learning a plurality of weak discriminators for outputting an estimate indicating that the grayscale image is an object or not in a group, using a characteristic quantity that is equal to the difference of the luminance values of two pixels at arbitrarily selected two different positions as input; and a combining means for selectively combining more than one weak discriminator from the plurality of weak discriminators according to a predetermined learning algorithm.]

[16. The device according to claim 15, wherein the learning means includes:

a weak discriminator generating means for computing the characteristic quantity of each of the learning samples and generating the weak discriminators according to the respective characteristic quantities;

an error ratio computing means for computing the error ratio of judging each of the learning samples according to the data weight defined for the learning sample for the weak discriminators generated by the weak discriminator generating means;

a reliability computing means for computing the reliability of the weak discriminators according to the error ratio; and a data weight computing means for updating the data weight relatively increase the weight of each learning sample that is discriminated as error by the weak discriminators;

wherein the weak discriminator generating means is capable of generating a new weak discriminator when the data weight is updated.]

[17. The device according to claim 16, wherein the weak discriminator generating means computes characteristic quantities of a plurality of different types by repeating the process of computing a characteristic quantity for a plurality of times, generate a weak discriminator candidate for each characteristic quantity, computes the error ratio of judging each learning sample according to the data weight defined for the learning sample and select the weak discriminator candidate showing the lowest error ratio as weak discriminator.]

[18. The device according to claim 16, wherein the weak discriminator generating means generates a weak discriminator candidate configured to judge if the grayscale image is an object depending on if the characteristic quantity of the grayscale image is greater than a predetermined threshold value.]

[19. The device according to claim 16, wherein the weak discriminator generating means generates a weak discriminator candidate configured to output the probability that the grayscale image is an object according to the characteristic quantity.]

[20. The device according to claim 16, further comprising:

a suspension threshold value storing means for storing the minimum value in the values of weighted majority decision, each being obtained as a result of that, each time the weak discriminator generating means generates a weak discriminator, the weak discriminator generating means computes an estimate for each learning sample that is an object by means of the weak discriminator and also computes the value of the weighted majority decision obtained by weighting the estimate with the reliability.]

[21. An ensemble learning method of using learning samples of a plurality of grayscale images provided with respective correct answers telling if each of the grayscale images is an object, the device comprising:

a learning step of learning a plurality of weak discriminators for outputting an estimate indicating that the grayscale image is an object or not in a group, using a characteristic quantity that is equal to the difference of the luminance values of two pixels at arbitrarily selected two different positions as input; and a combining step of selectively combining more than one weak discriminator from the plurality of weak discriminators according to a predetermined learning algorithm.]

[22. The method according to claim 21, wherein the learning step is configured to repeat a series of steps including:

a weak discriminator generating step of for computing the characteristic quantity of each of the learning samples and generating the weak discriminators according to the respective characteristic quantities;

an error ratio computing step of computing the error ratio of judging each of the learning samples according to the data weight defined for the learning sample for the weak discriminators generated by the weak discriminator generating means;

a reliability computing step of computing the reliability of the weak discriminators according to the error ratio; and a data weight computing step of updating the data weight so as to relatively increase the weight of each learning sample that is discriminated as error by the weak discriminators.]

[23. The method according to claim 22, wherein characteristic quantities of a plurality of different types are computed by repeating the process of computing a characteristic quantity for a plurality of times and a weak discriminator candidate is generated for each characteristic quantity, while the error ratio of judging each learning sample is computed according to the data weight defined for the learning sample and the weak discriminator candidate showing the lowest error ratio is selected as weak discriminator in the weak discriminator generating step.]

[24. The method according to claim 22, wherein a weak discriminator candidate configured to judge if the grayscale image is an object depending on if the characteristic quantity of the grayscale image is greater than a predetermined threshold value is generated in the weak discriminating generating step.]

[25. The method according to claim 22, wherein a weak discriminator candidate configured to output the probability that the grayscale image is an object according to the characteristic quantity is generated in the weak discriminator generating step.]

[26. The method according to claim 22, further comprising:

a suspension threshold value storing step of storing the minimum value in the values of weighted majority decision, each being obtained as a result of that, each time weak discriminating is generated in the weak discriminator generating step, an estimate for each learning sample that is an object is computed by means of the weak discriminator and the value of the weighted majority decision obtained by weighting the estimate with the reliability is also computed in the weak discriminator generating step.]

[27. An object detecting device for cutting out a window image of a fixed size from a grayscale image and detecting if the grayscale image is an object, the device comprising:

a scale converting means for generating a scaled image by scaling up or down the size of the input grayscale image;

a window image scanning means for scanning the window of the fixed size out of the scaled image and cutting out a window image; and an object detecting means for detecting if the given window image is an object;

the object detecting means having:

a plurality of weak discriminating means for computing an estimate indicating that the window image is an object according to a characteristic quantity that is equal to the difference of the luminance values of two pixels at two different positions that is learned in advance; and a discriminating means for judging if the window image is an object according to the estimate computed by one of or the estimates computed by more than one of the plurality of weak discriminating means.]

[28. The device according to claim 27, wherein the discriminating means computes the value of the weighted majority decision by multiplying the estimate or each of the estimates by the reliability of each of the weak discriminating means obtained as a result of the learning and adding it and judges if the grayscale image is an object according to the value of the majority decision.]

[29. The device according to claim 28, wherein the plurality of weak discriminating means sequentially compute the estimates; and the discriminating means sequentially updates the value of the weighted majority decision each time an estimate is computed and controls the estimate computing operation so as to suspend it or not according to the updated value of the weighted majority decision.]

[30. The object detecting device according to claim 27, wherein the object is a face.]

[31. The object detecting device according to claim 27, wherein the object is a characteristic of a face.]

[32. The object detecting device according to claim 27, wherein the object is a particular gender.]

[33. The object detecting device according to claim 27, wherein the object is either an adult or a child.]

[34. An object detecting method for cutting out a window image of a fixed size from a grayscale image and detecting if the grayscale image is an object, the method comprising:

a scale converting step of generating a scaled image by scaling up or down the size of the input grayscale image;

a window image scanning step of scanning the window of the fixed size out of the scaled image and cutting out a window image; and an object detecting step of for detecting if the given window image is an object;

the object detecting step having:

a weak discriminating step of computing an estimate indicating that the window image is an object or not according to a characteristic quantity that is equal to the difference of the luminance values of two pixels at two different positions that is learned in advance by each of a plurality of weak discriminators; and a discriminating step of judging if the window image is an object according to the estimate computed by one of or the estimates computed by more than one of the plurality of weak discriminating means.]

[35. The method according to claim 34, wherein the value of the weighted majority decision is computed by multiplying the estimate or each of the estimates by the reliability of each of the weak discriminators obtained as a result of the learning and adding it and it is judged if the grayscale image is an object according to the value of the majority decision in the discriminating step.]

[36. The method according to claim 35, wherein the plurality of weak discriminators sequentially compute the estimates in the weak discriminating step; and wherein the value of the weighted majority decision is sequentially updated each time an estimate is computed and wherein the estimate computing operation is so controlled as to suspend it or not according to the updated value of the weighted majority decision in the discriminating step.]

[37. An object detecting device for detecting if a given grayscale image is an object, the device comprising:

a plurality of weak discriminating units configured to compute an estimate indicating that the grayscale image is an object or not according to a characteristic quantity that is equal to the difference of the luminance values of two pixels at two different positions; and a discriminating unit configured to judge if the grayscale image is an object according to the estimate computed by one of or the estimates computed by more than one of the plurality of weak discriminating units.]

*38. A detecting device for detecting objects in an image comprised of pixels comprising:*

*a discriminating unit configured to determine inter-pixel differences, each a difference between luminance values of two arbitrary pixels at two different positions of the image, including non-adjacent pixels, and sequentially outputting estimates that the image includes an object, based on said inter-pixel differences;*

*a group learning machine configured to provide learned estimates of objects included in plural training images, learned in advance, by making plural determinations equal to the difference of the luminance values of two pixels at arbitrarily selected two different positions in respective training images; and*

*a judging unit using estimates of objects learned from group learning for determining whether the image includes an object according to a comparison of the estimate outputted by the discriminating unit to the learned estimates and for suspending the outputting of estimates by the discriminating unit depending upon the value of an outputted estimate compared to a threshold value learned in advance.*

*39. The detecting device of claim 38, wherein the discriminating unit outputs an estimate of probability that the image includes an object.*

*40. The detecting device of claim 38, wherein the discriminating unit comprises plural discriminators, each sequentially outputting an estimate of probability that the image includes an object, and the outputted estimate is made by combining the estimates of the plural discriminators.*

*41. A detecting method for detecting objects in an image comprised of pixels comprising the steps of:*

*determining inter-pixel differences, each a difference between luminance values of two arbitrary pixels at two different positions of the image, including non-adjacent pixels, and sequentially outputting estimates that the image includes an object, based on said inter-pixel differences;*

*learning in advance estimates of objects included in plural training images by making plural determinations equal to the difference of the luminance values of two pixels at arbitrarily selected two different positions in respective training images; and*

*using estimates of objects learned from group learning for determining whether the image includes an object according to a comparison of the outputted estimate to the learned estimates and suspending the outputting of estimates depending upon the value of an outputted estimate compared to a threshold value learned in advance.*

*42. The method of claim 41, wherein the outputted estimate is an estimate of probability that the image includes an object.*

*43. The method of claim 41, wherein the outputted estimate is a combination of plural determinations of differences between pixel values of said two arbitrary pixels.*

* * * * *